US011475675B2

(12) United States Patent
Urtasun et al.

(10) Patent No.: US 11,475,675 B2
(45) Date of Patent: Oct. 18, 2022

(54) SYSTEMS AND METHODS FOR IDENTIFYING UNKNOWN INSTANCES

(71) Applicant: UATC, LLC, San Francisco, CA (US)

(72) Inventors: Raquel Urtasun, Toronto (CA); Kelvin Ka Wing Wong, Toronto (CA); Shenlong Wang, Toronto (CA); Mengye Ren, Toronto (CA); Ming Liang, Toronto (CA)

(73) Assignee: UATC, LLC, Mountain View, CA (US)

( * ) Notice: Subject to any disclaimer, the term of this patent is extended or adjusted under 35 U.S.C. 154(b) by 371 days.

(21) Appl. No.: 16/825,266

(22) Filed: Mar. 20, 2020

(65) Prior Publication Data
US 2021/0012116 A1    Jan. 14, 2021

Related U.S. Application Data

(60) Provisional application No. 62/925,288, filed on Oct. 24, 2019, provisional application No. 62/871,458, filed on Jul. 8, 2019.

(51) Int. Cl.
*G06K 9/00* (2022.01)
*G06N 20/00* (2019.01)
(Continued)

(52) U.S. Cl.
CPC ........... *G06V 20/56* (2022.01); *G06K 9/6259* (2013.01); *G06N 20/00* (2019.01); *G06V 10/757* (2022.01)

(58) Field of Classification Search
CPC ...... G06N 20/00; G06N 3/0454; G06N 3/084; G06V 10/454; G06V 10/757; G06V 10/82; G06V 20/56; G06V 20/58
See application file for complete search history.

(56) References Cited

U.S. PATENT DOCUMENTS 11,200,429 B1 * 12/2021 Evans ...................... G06N 3/08
2018/0112997 A1 * 4/2018 Fasola ................. G06V 20/584
(Continued)

OTHER PUBLICATIONS

Antunes et al., "The novel object recognition memory: neurobiology, test procedure, and its modifications." Cognitive processing 13, No. 2, 2012, pp. 93-110.
(Continued)

*Primary Examiner* — Liton Miah
(74) *Attorney, Agent, or Firm* — Dority & Manning, P.A.

(57) ABSTRACT

Systems and methods of the present disclosure provide an improved approach for open-set instance segmentation by identifying both known and unknown instances in an environment. For example, a method can include receiving sensor point cloud input data including a plurality of three-dimensional points. The method can include determining a feature embedding and at least one of an instance embedding, class embedding, and/or background embedding for each of the plurality of three-dimensional points. The method can include determining a first subset of points associated with one or more known instances within the environment based on the class embedding and the background embedding associated with each point in the plurality of points. The method can include determining a second subset of points associated with one or more unknown instances within the environment based on the first subset of points. The method can include segmenting the input data into known and unknown instances.

20 Claims, 8 Drawing Sheets

(51) Int. Cl.
*G06K 9/62* (2022.01)
*G06V 20/56* (2022.01)
*G06V 10/75* (2022.01)

(56) References Cited

U.S. PATENT DOCUMENTS

| | | | | |
|---|---|---|---|---|
| 2018/0260613 | A1* | 9/2018 | Gao | G06T 7/292 |
| 2019/0092318 | A1* | 3/2019 | Mei | B60W 30/09 |
| 2019/0205668 | A1* | 7/2019 | Noda | G06T 7/44 |
| 2019/0304105 | A1* | 10/2019 | Gao | G06V 10/454 |
| 2020/0257975 | A1* | 8/2020 | Chang | G06N 3/04 |
| 2021/0166049 | A1* | 6/2021 | Tariq | G06N 3/088 |

OTHER PUBLICATIONS

Arbelaez et al., "Contour detection and hierarchical image segmentation." IEEE transactions on pattern analysis and machine intelligence 33, No. 5, 2010, pp. 898-916.
Bendale et al., "Towards open set deep networks." In Proceedings of the IEEE conference on computer vision and pattern recognition, 2016, pp. 1563-1572.
Chen et al., "Tensormask: A foundation for dense object segmentation." In Proceedings of the IEEE/CVF International Conference on Computer Vision, 2019, pp. 2061-2069.
Cheng, "Mean shift, mode seeking, and clustering." IEEE transactions on pattern analysis and machine intelligence 17, No. 8, 1995, pp. 790-799.
Cordts et al., "The cityscapes dataset for semantic urban scene understanding." In *Proceedings of the IEEE conference on computer vision and pattern recognition*, 2016, pp. 3213-3223.
De Brabandere et al., "Semantic instance segmentation with a discriminative loss function." arXiv preprint arXiv:1708.0255, 2017, 10 pp.
Elich et al., "3d bird's-eye-view instance segmentation." In German Conference on Pattern Recognition, Springer, Cham, 2019, pp. 48-61.
Ennaceur et al., "A new one-trial test for neurobiological studies of memory in rats. 1: Behavioral data." Behavioural brain research 31, No. 1, 1988, pp. 47-59.
Ester et al. "A density-based algorithm for discovering clusters in large spatial databases with noise." In kdd, vol. 96, No. 34, 1996, pp. 226-231.
Everingham et al., "The pascal visual object classes (VOC) challenge." IJCV, 88(2), 2010, pp. 303-338.
Fathi et al., "Semantic instance segmentation via deep metric learning." arXiv preprint arXiv:1703.10277, 2017, 9 pp.
Felzenszwalb et al., "Efficient graph-based image segmentation." International journal of computer vision 59, No. 2, 2004, pp. 167-181.
Frome et al., "Devise: A deep visual-semantic embedding model." Advances in neural information processing systems 26, 2013, 9 pp.
He et al., "Mask r-cnn." In Proceedings of the IEEE international conference on computer vision, 2017, pp. 2961-2969.
Hu, et al. "Learning to segment every thing." In Proceedings of the IEEE Conference on Computer Vision and Pattern Recognition, 2018, pp. 4233-4241.
Kingma et al., "Adam: A Method for Stochastic Optimization. ICLR. 2015." arXiv preprint arXiv:1412.6980 9, 2015.
Kirillov et al., "Panoptic segmentation." In Proceedings of the IEEE/CVF Conference on Computer Vision and Pattern Recognition, 2019, pp. 9404-9413.
Kong et al., "Recurrent pixel embedding for instance grouping." In Proceedings of the IEEE Conference on Computer Vision and Pattern Recognition, 2018, pp. 9018-9028.
Krishna et al., "Visual genome: Connecting language and vision using crowdsourced dense image annotations." International journal of computer vision 123, No. 1, 2017, pp. 32-73.

Lee et al., "Training confidence-calibrated classifiers for detecting out-of-distribution samples." arXiv preprint arXiv:1711.09325, 2017, 16 pp.
Liang et al., "Proposal-free network for instance-level object segmentation." IEEE transactions on pattern analysis and machine intelligence 40, No. 12, 2017, pp. 2978-2991.
Lin et al., "Microsoft coco: Common objects in context." In European conference on computer vision, Springer, Cham, 2014, pp. 740-755.
Liu et al., "Large-scale long-tailed recognition in an open world." In Proceedings of the IEEE/CVF Conference on Computer Vision and Pattern Recognition, 2019, pp. 2537-2546.
Liu et al., "Masc: Multi-scale affinity with sparse convolution for 3d instance segmentation." arXiv preprint arXiv:1902.04478, 2019, 4 pp.
Liu et al., "Sgn: Sequential grouping networks for instance segmentation." In Proceedings of the IEEE International Conference on Computer Vision, 2017, pp. 3496-3504.
Neven et al., "Instance segmentation by jointly optimizing spatial embeddings and clustering bandwidth." In Proceedings of the IEEE/CVF Conference on Computer Vision and Pattern Recognition, 2019, pp. 8837-8845.
Newell et al., "Associative embedding: End-to-end learning for joint detection and grouping." Advances in neural information processing systems 30, 2017, 11 pp.
Ošep et al., "4d generic video object proposals." In 2020 IEEE International Conference on Robotics and Automation (ICRA), IEEE, 2020, pp. 10031-10037.
Palmer, "Organizing objects and scenes." Foundations of cognitive psychology: Core readings, 2002, pp. 189-211.
Palmer, "Vision science: Photons to phenomenology." MIT press, 1999, 4 pp.
Pham et al., "Bayesian semantic instance segmentation in open set world." In Proceedings of the European Conference on Computer Vision (ECCV), 2018, pp. 3-18.
Pham et al., "JSIS3D: Joint semantic-instance segmentation of 3D point clouds with multi-task pointwise networks and multi-value conditional random fields." In Proceedings of the IEEE/CVF Conference on Computer Vision and Pattern Recognition, 2019, pp. 8827-8836.
Pinheiro et al., "Learning to refine object segments." In European conference on computer vision, Springer, Cham, 2016, pp. 75-91.
Pinheiro et al., "Learning to segment object candidates." Advances in neural information processing systems 28, 2015, 9 pp.
Qi et al., "Frustum pointnets for 3d object detection from rgb-d data." In Proceedings of the IEEE conference on computer vision and pattern recognition, 2018, pp. 918-927.
Ren et al., "End-to-end instance segmentation with recurrent attention." In Proceedings of the IEEE conference on computer vision and pattern recognition, 2017, pp. 6656-6664.
Ren et al., "Meta-learning for semi-supervised few-shot classification." arXiv preprint arXiv:1803.00676, 2018, 15 pp.
Saxena et al., "Robotic grasping of novel objects using vision." The International Journal of Robotics Research 27, No. 2, 2008, pp. 157-173.
Scheirer et al., "Toward open set recognition." PAMI 35, No. 7, 2013, pp. 1757-1772.
Shi et al. "Normalized cuts and image segmentation." IEEE Transactions on pattern analysis and machine intelligence 22, No. 8, 2000, pp. 888-905.
Snell et al., "Prototypical networks for few-shot learning." Advances in neural information processing systems 30, 2017, 11 pp.
Socher et al.,"Zero-shot learning through cross-modal transfer." Advances in neural information processing systems 26, 2013, 10 pp.
Song et al., "Deep sliding shapes for amodal 3d object detection in rgb-d images." In Proceedings of the IEEE conference on computer vision and pattern recognition, 2016, pp. 808-816.
Tchapmi et al., "Segcloud: Semantic segmentation of 3d point clouds." In 2017 international conference on 3D vision (3DV), IEEE, 2017, pp. 537-547.
Trevor et al., "Efficient organized point cloud segmentation with connected components." Semantic Perception Mapping and Exploration (SPME), 2013, 6 pp.

(56) References Cited

OTHER PUBLICATIONS

Wang et al., "Sgpn: Similarity group proposal network for 3d point cloud instance segmentation." In Proceedings of the IEEE conference on computer vision and pattern recognition, 2018, pp. 2569-2578.
Xian et al., In Proceedings of the IEEE conference on computer vision and pattern recognition, 2016, pp. 69-77.
Xiong et al., "Upsnet: A unified panoptic segmentation network." In Proceedings of the IEEE/CVF Conference on Computer Vision and Pattern Recognition, 2019, pp. 8818-8826.
Yang et al., "Hdnet: Exploiting hd maps for 3d object detection." In Conference on Robot Learning, PMLR, 2018, pp. 146-155.
Zhang et al., "Efficient convolutions for real-time semantic segmentation of 3d point clouds." In 2018 International Conference on 3D Vision (3DV), IEEE, 2018, pp. 399-408.

\* cited by examiner

SYSTEMS AND METHODS FOR IDENTIFYING UNKNOWN INSTANCES

PRIORITY

The present application is based on and claims benefit of U.S. Provisional Patent Application No. 62/925,288 having a filing date of Oct. 24, 2019, and U.S. Provisional Patent Application No. 62/871,458 having a filing date of Jul. 8, 2019, both of which are incorporated by reference herein.

FIELD

The present disclosure relates generally to autonomous vehicle perception and control. In particular, autonomous vehicles can be controlled to navigate a surrounding environment. In some instances, autonomous vehicles can be controlled to facilitate navigation with respect to objects in a surrounding environment.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for identifying unknown instances within an environment. The method includes receiving, by a computing system including one or more computing devices, sensor point cloud input data. The sensor point cloud input data can include a plurality of points with each point including one or more three-dimensional coordinates. The method can include determining, by the computing system, a feature embedding for each respective point of the plurality of points by inputting each point into a machine-learned feature embedding model. The method can include, for each respective point of the plurality of points, determining, by the computing system, at least one of an instance embedding, a class embedding, or a background embedding by inputting each respective point and the feature embedding associated with the respective point into a machine-learned category-agnostic instance model. The method can include determining, by the computing system, a first subset of points associated with one or more known instances within an environment based, at least in part, on the class embedding or the background embedding associated with one or more respective points of the plurality of points. Each one of the one or more known instances can be associated with a respective class-specific semantic label of one or more class-specific semantic labels. The method can include determining, by the computing system, a second subset of points associated with one or more unknown instances within the environment based, at least in part, on the first subset of points. The one or more unknown instances can be not associated with the one or more class-specific semantic labels. And, the method can include clustering, by the computing system, each respective point in the second subset of points into a respective unknown instance of the one or more unknown instances based, at least in part, on the instance embedding and the three-dimensional coordinates associated with the respective point.

Another example aspect of the present disclosure is directed to a computing system including one or more processors and one or more tangible, non-transitory, computer readable media that collectively store instruction that when executed by the one or more processors cause the computing system to perform operations. The operation include receiving sensor point cloud input data. The sensor point cloud input data can include a plurality of points with each point including one or more three-dimensional coordinates. The operations can include determining a feature embedding for each respective point of the plurality of points by inputting each respective point into a machine-learned feature embedding model. The operations can include, for each respective point of the plurality of points, determining at least one of an instance embedding, a class embedding, or a background embedding by inputting each respective point and the feature embedding associated with the respective point into a machine-learned category-agnostic instance model. The operations can include determining, for each respective point of the plurality of points, one or more anchor-point scores by inputting each respective point and the feature embedding associated with the respective point into a machine-learned instance scoring model. The operations can include identifying one or more object instances within an environment based, at least in part, on the one or more anchor-point scores associated with each respective point. The operations can include determining an anchor location for each object instance in the one or more object instances based, at least in part, on the one or more anchor-point scores associated with each respective point of the plurality of points. The operations can include identifying an anchor class embedding for each object instance of the one or more object instances based, at least in part, on the anchor location associated with each object instance. Each anchor class embedding can be indicative of a class embedding associated with a respective point of the plurality of points. The operations can include generating a set of anchor points can include one or more object anchor points. Each object anchor point can be indicative of an anchor class embedding associated with a respective object instance of the one or more object instances. The operations can include determining an object subset of points including one or more points of the plurality of points based, at least in part, on the one or more object anchor points. And, the operations can include clustering each respective point of the object subset of points with a respective object instance of the one or more object instances based, at least in part, on the class embedding associated with the respective point.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
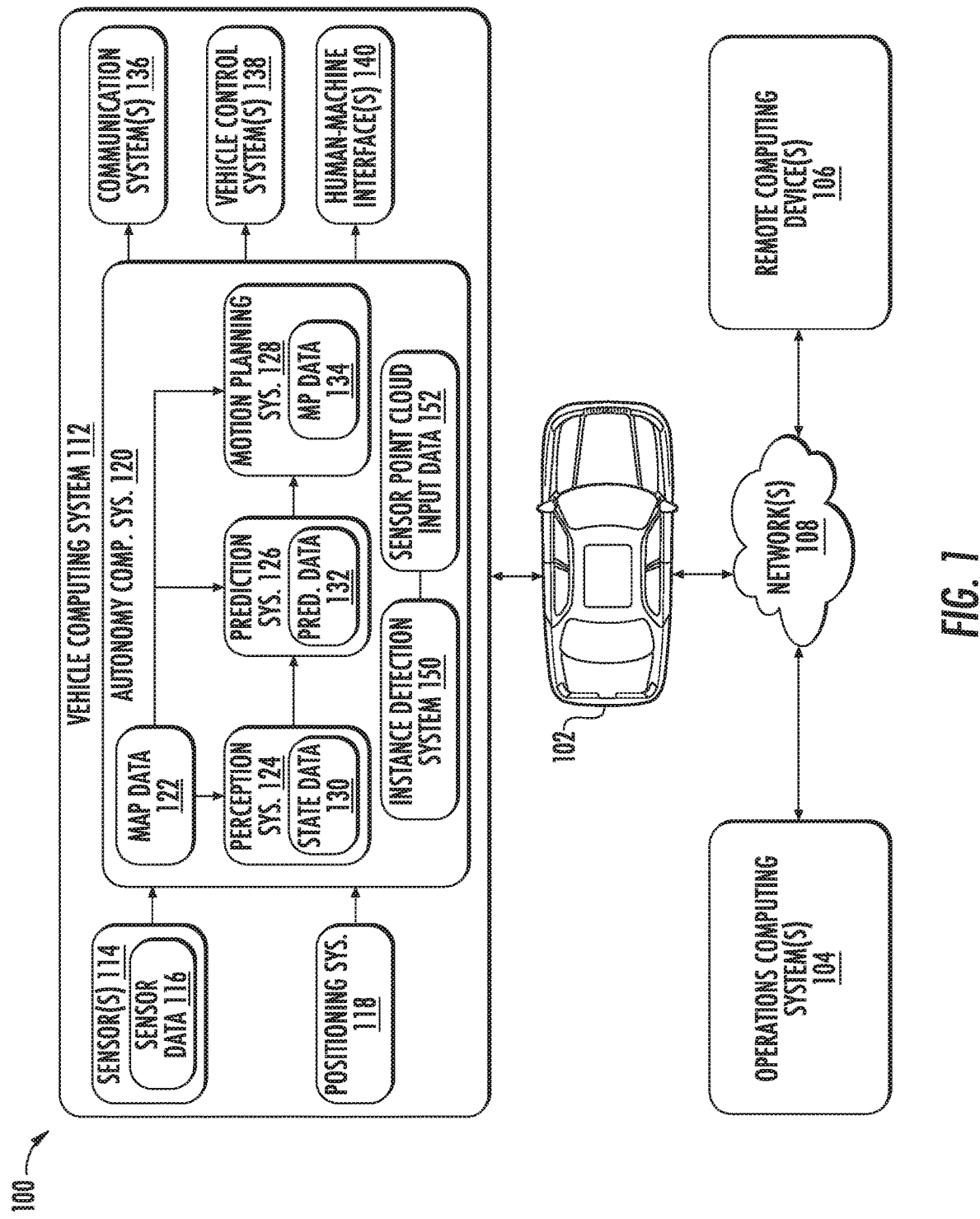
FIG. 1 depicts an example system overview according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved systems and methods for the identification of unknown instances for a robot's environment such as, for example, in an autonomous driving context. An instance can represent, for example, a known and/or unknown object (e.g., vehicles, pedestrians, animals, light posts, traffic signs, etc.) or a background object (e.g., roadways, buildings, mountains, etc.) within an environment. In particular, the systems and methods of the present disclosure provide for the classification of point features into one or more "known" and unknown" classes. By way of example, an instance detection system can feed sensor point cloud input data (e.g., LiDAR data, rasterized image data, etc.) through a machine-learned model to receive point embeddings (e.g., class embeddings, background embeddings, instance embeddings, etc.) for known classes (e.g., "things"), backgrounds (e.g., "stuff"), and unknown instances. The instance detection system can perform closed-set perception by associating one or more points in the sensor point cloud input data with a known class or background. Points with uncertain associations (e.g., uncertain points) can be classified as an "unknown class." The instance detection system can identify unknown instances by clustering the uncertain points into one or more unknown instances and assigning each uncertain point to a respective unknown instance. This allows the instance detection system to assign semantic labels to all points in sensor point cloud input data, regardless of whether the point is associated with a closed set of semantic classes. Thus, the instance detection system can perform a novel open-set instance segmentation on sensor point cloud input data that can produce both representations of known and unknown classes in a holistic way. As such, a robot (e.g., an autonomous vehicle) can be configured to safely and comfortably navigate an environment by accounting for objects with unknown classifications.

The following describes the technology of this disclosure within the context of an autonomous vehicle for example purposes only. As described herein, the technology described herein is not limited to an autonomous vehicle and the technology can be implemented within other robotic and computing systems.

An autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors, an autonomy computing system (e.g., for determining autonomous navigation), one or more vehicle control systems (e.g., for controlling braking, steering, powertrain, etc.), and/or other systems. The vehicle computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

In some implementations, the vehicle computing system can include an instance detection system. For example, the instance detection system can be configured to detect one or more known and unknown instances within the surrounding environment of the autonomous vehicle. In some implementations, the instance detection system can be included in or a part of a perception system. The instance detection system is not limited to autonomous vehicles and can be implemented in any device. For example, in some implementations, the instance detection system can be included in or as a part of an autonomous robot or one or more mobile devices. For example, the instance detection system can be included in an autonomous robot and can be configured to identify one or more known or unknown objects within the surrounding environment of the robot.

To help do so, the instance detection system can receive point could input data. The point cloud input data can include, for instance, sensor point cloud input data. By way of example, the sensor point cloud input data can be obtained by one or more sensors (e.g., LiDAR sensors, cameras, etc.) onboard the autonomous vehicle, autonomous robot, etc. The sensor point cloud input data can include a light detection and ranging ("LIDAR") point cloud containing a plurality of points. Each point of the plurality of points can include image data (e.g., pixel data, etc.) and/or one or more three-dimensional coordinates (e.g., Cartesian coordinates, polar coordinates, etc.).

In some implementations, the sensor point cloud input data can include a bird's eye view (BEV) rasterized image. For example, the sensor point cloud input data can be represented as a two-dimensional image grid. For instance, the space can be discretized into a two-dimensional image grid. Occupancy along the vertical axis of the two-dimensional grid can be treated as multi-dimensional features, for example, by using reversed trilinear interpolation. Moreover, in some implementations, the sensor point cloud input data can include data from a plurality of LiDAR frames to implicitly exploit temporal contexts. In some implementations, localization techniques can be used to alleviate misalignment across the plurality of LiDAR frames due to the motion of the autonomous vehicle.

The instance detection system can feed the sensor point cloud input data into machine-learned model(s) to identify one or more known and unknown instances within an environment. As described in further detail below, the machine-learned model(s) can include a backbone feature network (e.g., a machine-learned feature embedding model) with two branches. A first branch can include a machine-learned instance scoring model (e.g., a scoring head) configured to detect known instances (e.g., instances associated with known semantic labels) within an environment. A second branch can include a machine-learned category-agnostic instance model (e.g., an embedding head) configured to provide point embeddings for each point in the sensor point cloud input data. For example, the machine-learned category-agnostic instance model can branch into three outputs. A first output can include a class embedding (e.g., a BEV "thing" embedding) used as a prototypical instance embedding for known classes; a second output can include an instance embedding (e.g., an instance-aware point embedding); and a third output can include a background embedding (e.g., a "stuff" embedding) for known background classes.

In some implementations, the machine-learned feature embedding model, the machine-learned instance scoring model, and the machine-learned category-agnostic instance model can include one or more portions of a neural network. For example, in some implementations, the machine-learned feature embedding model, the machine-learned instance scoring model, and the machine-learned category-agnostic instance model can be jointly trained end-to-end via backpropagation. By way of example, the neural network can be trained utilizing a loss function that measures a combination of detection loss and prototypical association loss. In some implementations, the loss function can be fully differentiable with respect to the neural network parameters.

More particularly, the instance detection system can determine a feature embedding for each respective point of the plurality of points (e.g., of the sensor point cloud input data) by inputting each point into the machine-learned feature embedding model. For example, the instance detection system can input each respective point of the plurality of points into the machine-learned feature embedding model to obtain a feature embedding for the respective point. By way of example, the machine-learned feature embedding model can include a customized lightweight feature pyramid network and the feature embedding can include a feature hierarchy that consists of three scales. Each pyramid level can include several residual blocks. Multi-scale feature maps can be densely connected at the final residual block output to exchange multi-scale information. The multi-scale feature maps can be followed by an additional convolutional layer to aggregate the information. In addition, the two coarse scales can be merged into a final output feature map using lateral residual connections. In this manner, the instance detection system can output a feature embedding for each point indicative of one or more point features.

The instance detection system can determine one or more anchor-point scores for each respective point of the plurality of points. The instance detection system can determine the one or more anchor-point scores by inputting each respective point and the feature embedding associated with the respective point into the machine-learned instance scoring model. For example, the instance detection system can input each respective point of the plurality of points and a respective feature embedding associated with the respective point into the machine-learned instance scoring model to obtain the one or more anchor-point scores for the respective point. The machine-learned instance scoring model can include a semantic class header. The semantic class header can include four 3×3 convolutional layers, followed by a 1×1 convolutional layer. The one or more anchor-point scores can be represented by a dense score C×H×W representing a likelihood of an anchor presence at a specific point for a known semantic class. For example, C can include the number of closed-set classes, whereas H and W can include frame dimensions. Thus, the one or more anchor-point scores for the respective point can be indicative of a likelihood that the respective point is associated with one or more known semantic classes in a closed set of semantic classes. By way of example, given point i and a class c, the score can be defined as $\alpha_{i,c}$.

The instance detection system can obtain a plurality of additional point embeddings for each point of the plurality of points. For example, the instance detection system can determine, for each respective point of the plurality of points, at least one of an instance embedding, a class embedding, and/or a background embedding by inputting each respective point and the feature embedding associated with the respective point into the machine-learned category-agnostic instance model. By way of example, the instance detection system can input each respective point of the plurality of points and a respective feature embedding associated with the respective point into the machine-learned category-agnostic instance model to obtain the instance embedding, the class embedding, and/or the background embedding for the respective point.

The machine-learned category-agnostic instance model can include an embedding header. The embedding header can include a four-layer 3×3 convolutional network. The four-layer 3×3 convolutional network can be followed by three separate 1×1 convolutional layers. Each separate 1×1 convolutional layer can output a different embedding branch. For example, a first convolutional layer (e.g., a "point embedding header") can output the instance embedding; a second convolutional layer (e.g., a "thing" embedding head) can output the class embedding; and a third convolutional layer (e.g., a "stuff" embedding head) can output the background embedding.

The instance embedding can include an instance-aware point embedding. In some implementations, the first convolutional layer can output a respective instance embedding for each point of the plurality of points. For example, each instance embedding can include an embedding vector for a point in the three-dimensional voxel space. By way of example, a final embedding map can have a shape of F×Z×H×W, where F is the dimension of the embedding space. For each point i, the instance detection system can obtain a point-wise instance aware feature $\varphi_i$ using trilinear interpolation on a three-dimensional feature map.

The class embedding can include a feature vector associated with one or more known object-classes within the environment. For example, the class embedding can include one or more predicted prototypical instance features. By way of example, the second convolution layer can encode a mean feature vector $\mu$ and a scalar variance $\sigma^2$ for each object-class in the one or more object-classes. In this manner, the dimension of the feature map (e.g., BEV embedding map) can be (F+1)×H×W.

In addition, the background embedding can include a feature vector associated with one or more background classes within the environment. For example, the background embedding can include an F-dimensional mean feature vector and a scalar variance for each of the one or more background classes (e.g., denoted as M). By way of example, the third convolutional network can include global average pooling and a 1×1 convolution.

The instance detection system can identify one or more object instances within the environment. For example, the instance detection system can identify each object instance based, at least in part, on the one or more anchor-point scores associated with each respective point of the plurality of points. By way of example, the one or more anchor-point scores can represent a likelihood of an anchor presence at a specific point for a known sematic class in a closed set of semantic classes. In some implementations, the instance detection system can identify a particular object instance when at least one point of the plurality of points is associated with at least one anchor-point score representing a high likelihood of an anchor presence for the particular object instance. In this manner, the instance detection system can identify the presence of one or more object instances within the environment before analyzing the one or more object-class embeddings associated with the plurality of points.

The one or more object instances can include one or more objects within the environment. For example, an object instance can include one or more dynamic objects (e.g., moving objects (actors) such as vehicles, pedestrians, bicycles, etc.) and/or one or more static objects (e.g., non-moving objects such as street signs, construction cones, non-moving vehicles/pedestrians/bicycles, etc.). The one or more object instances can be associated with a closed-set of object-specific semantic labels. For example, the closed-set of object-specific semantic labels can include a closed-set of known classes that have been previously seen (e.g., by the machine-learned model(s)) during training. In this manner, the machine-learned model(s) can be trained to identify and classify a point with an object-specific semantic label, with high confidence, based on features previously detected during training.

The instance detection system can determine an anchor location for each object instance in the one or more object instances. For example, each anchor location can be determined based, at least in part, on the one or more anchor-point scores associated with each point of the plurality of points. For example, given the anchor-point scores (e.g., learned class-aware anchor maps) and the class embeddings (e.g., dense embedding maps from the machine-learned model(s)), the instance detection system can determine class-specific anchor locations using non-maximal suppression. In addition, the instance detection system can identify an anchor class embedding for each object instance in the one or more object instances based, at least in part, on the anchor location associated with each object instance. For example, each anchor class embedding can be indicative of a respective class embedding associated with a respective point of the plurality of points. By way of example, the instance detection system can determine each class's mean $\mu_k$ and variance $\sigma_k$ (e.g., class embedding) by bilinear interpolating the class embeddings associated with one or more points in the plurality of points (e.g., the class embedding map) around the predicted anchor location.

The instance detection system can generate a set of anchor points based on the identified anchor class embeddings for each object instance in the one or more object instances. For example, the set of anchor points can include one or more object anchor points. Each object anchor point can be indicative of an anchor class embedding for a respective object instance in the one or more object instances. In addition, or alternatively, the set of anchor points can include one or more background anchor points. Each of the one or more background anchor points can be indicative of a background embedding associated with a respective point of the plurality of points. For example, the instance detection system can concatenate one or more background anchor points to the set of anchor points. By way of example, the instance detection system can obtain the background embeddings output from the machine-learned category-agnostic instance model and concatenate them with the class embeddings associated with the one or more object instances. In this manner, the instance detection system can build a final list of prototype anchors including one or more class embeddings and one or more background embeddings. For example, the set of anchor points can include a set of $\{\mu_k, \sigma^2\}_{k=1, \ldots, K+M}$, where K is the number of known object-classes and M is the number of known background-classes within the environment.

The instance detection system can determine a first subset of points (e.g., from the plurality of points) associated with the one or more known instances within the environment. The one or more known instances, for example, can be associated with a class-specific (e.g., object class-specific, background class-specific, etc.) semantic label. By way of example, the one or more known instances can include one or more object classes and/or one or more background classes that have been previously identified by the machine-learned model(s). For example, the first subset of points can be determined based, at least in part, on the class embedding and the background embedding associated with each respective point of the plurality of points. In this manner, the first subset of points can include an object subset of points and a background subset of points.

The object subset of points, for example, can be associated with the one or more object instances within the environment. The instance detection system can determine the object subset of points based, at least in part, on the one or more object anchor points in the set of anchor points. By way of example, the instance detection system can determine the object subset of points based, at least in part, on the respective class embedding associated with each respective point of the plurality of points. In this way, the object subset of points can include each respective point with an associated class embedding that is associated with a respective object instance in the one or more object instances.

In addition, the background subset of points can be associated with one or more background instances within the environment. For example, a background instance can include one or more background travel features, such as, for example, roads, buildings, medians, fences, etc. The one or more background instances can be associated with a closed-set of background-specific semantic labels. For example, the closed-set of background-specific semantic labels can include a closed-set of known background classes that have been previously observed (e.g., by the machine-learned model(s)) during training. The instance detection system can determine the background subset of points based, at least in part, on the one or more background anchor points in the set of anchor points. For example, the instance detection system can determine the background subset of points based, at least in part, on the background embedding associated with each respective point of the plurality of points.

More particularly, the first subset of points can be determined by comparing each anchor point in the set of anchor points to each point of the plurality of points. For example, the instance detection system can determine a point-anchor association score for each respective point of the plurality of points. The point-anchor association score can be based, at least in part, on a comparison between the class embedding and/or the background embedding associated with the respective point and the set of anchor points. For instance, the point-anchor association score can be indicative of a similarity between the respective point (e.g., a class embedding and/or a background embedding associated with the respective point) and at least one anchor point in the set of anchor points. For example, the point-anchor association score can be designed to be proportional to each point's log-likelihood. By way of example, each prototype can follow a Gaussian distribution parameterized by $\{\mu_k, \sigma^2_k\}$ over the embedding space.

The first subset of points can be determined based, at least in part, on the point-anchor association score associated with each respective point of the plurality of points. For example, each respective point in the first subset of points can be associated with a point-anchor association score within a similarity threshold. The similarity threshold, for example, can include a learnable distance parameter U. Any point associated with a point-anchor association score within the similarity threshold can be included in the first subset of points. By way of example, a similarity between each point of the plurality of points and an anchor point can be computed by:

$$\hat{y}_{i,k} = \begin{cases} -\frac{\|\phi_i - \mu_k\|^2}{2\sigma^2_k} - \frac{F}{2}\log\sigma^2_k & \forall k = 1 \ldots K + M \\ -U, & \text{if } k = K + M + 1 \end{cases}$$

where d is the feature channel index and F is the embedding dimension; and $\hat{y}_{i,k}$ is the point-anchor association score.

The instance detection system can cluster each respective point of the object subset of points into a respective object instance in the one or more object instances based, at least in part, on the respective class embedding corresponding to each respective point. For example, the instance detection system can identify a respective object instance in the one or more object instances that is most similar to a respective point based, at least in part, on the point-anchor association score associated with the respective point. The instance detection system can assign a known semantic class label indicative of the respective object instance to the respective point. For example, the instance detection system can assign a known semantic class label indicative of the respective object instance to the respective point.

The instance detection system can determine a second subset of points including one or more points in the plurality of points. The second subset of points can be associated with one or more unknown instances within the environment. The instance detection system can determine the second subset of points based, at least in part, on the first subset of points. For example, the second subset of points can include every point of the plurality of points that is not included in the first subset of points.

By way of example, in some implementations, the instance embedding can be determined for every instance whether that instance is known or unknown. In addition, or alternatively, the class embedding can be determined only for instances associated with a known semantic class. In this manner, each class embedding can include information for a specific identifiable object, whereas each instance embedding can be indicative of a general marker indicating that "something" is there. In such a case, once all the instance embeddings associated with a point that is also associated a class embedding or a background embedding are removed, the remaining instance embeddings must be associated with an unknown object. In this manner, the instance detection system can determine a second subset of point indicative of unknown objects. For instance, the instance detection system can utilize the class embedding and the background embedding to identify the second subset of points. However, once the subset is identified, the class embedding, and the background embedding become redundant because the one or more point in the second subset are not associated with a class embedding or a background embedding. For example, the presence of a point is in the second subset of points can signify that the point is not associated with a specific class or background. Thus, the instance detection system can determine that the point is associated with an unknown instance.

For example, each point of the plurality of points can be assigned to a known class or, in the event that a point's association with all known anchors is not confident enough, an "unknown" class. For example, the instance detection system can associate each point of the plurality of points towards its k-nearest-neighbor anchor class embedding and all anchor background embeddings M to accelerate inference speed. The instance label can be determined by taking the argmax per each point i over the association score. In this manner, the instance detection system can assign one or more closed-set instance labels to most of the points in the plurality of points. The remaining points can be labelled as "unknown" points. Thus, the one or more unknown instances can include instances that are not associated with one or more class-specific semantic label within a closed set of semantic labels (e.g., an instance for which a semantic category is not known). For example, each unknown instance can include a dynamic object (e.g., animals, unique vehicles, etc.) and/or a static object (e.g., unique trees, branches, etc.) that has not been previously observed by the machine-learned system. Each unknown instance can include a number of unknown points. As described in detail below, each unknown point can be clustered based on its location with respect to the other unknown points in the second subset of points and the information in the instance embedding associated with the unknown point.

The instance detection system can assign an unknown semantic class label indicative of a respective unknown instance of the one or more unknown instances to each point of the second subset of points. In addition, the instance detection system can cluster each respective point of the second subset of points into the respective unknown instance. For example, the instance detection system can cluster each respective point based, at least in part, on the instance embedding and the three-dimensional coordinates associated with the respective point. By way of example, for all unknown points, the instance detection system can conduct a Density-based spatial clustering of applications with noise ("DBSCAN") based clustering. For instance, the pairwise squared distance used in DBSCAN is a convex combination of the instance embedding squared distance and its three-dimensional location squared distance. For example: ti $d_{ij}^2 = \beta \|x_i - x_j\|^2 + (1-\beta)\|\phi_i - \phi_j\|^2$.

As a result of the clustering, each unknown point can be assigned to an unknown instance. Combining this with the closed-set instance results, the instance detection system can assign instance labels to every point of the plurality of points, regardless of whether the instance is associated with a known category.

In this manner, the instance detection system and/or one or more systems onboard an autonomous vehicle (e.g., a vehicle computing system, perception system, etc.) can identify one or more known and one or more unknown objects within the surrounding environment of an autonomous vehicle. For example, one or more known objects can be identified based, at least in part, on the assigned known semantic class labels. In addition, or alternatively, one or more unknown objects can be identified based, at least in part, on the assigned unknown sematic class labels. In some implementations, the instance detection system and/or one or more systems onboard an autonomous vehicle (e.g., a vehicle computing system, motion planning system, etc.) can control of the motion of the autonomous vehicle based, at least in part, on the one or more known objects and the one or more unknown objects. For example, in some implementations, the instance detection system and/or one or more systems onboard an autonomous vehicle (e.g., a vehicle computing system, perception system, etc.) can communicate data indicative of one or more known and/or unknown objects to a motion planning system onboard the autonomous vehicle. In this manner, the motion planning system can determine a motion plan based, at least in part, on the identified known and unknown objects within the surrounding environment of the autonomous vehicle.

Example aspects of the present disclosure can provide a number of improvements to perception computing technology and robotics computing technology such as, for example, perception computing technology for autonomous driving. For instance, the systems and methods of the present disclosure provide an improved approach for open-set instance segmentation by identifying both known and unknown instances in an environment. For example, a computing system can receive sensor point cloud data including a plurality of three-dimensional points. The computing system can determine a feature embedding for each of the plurality of three-dimensional points by inputting each point into a feature embedding model. The computing system can determine, for each point of the plurality of points, at least one of an instance embedding, a class embedding, or a background embedding by inputting each point and the feature embedding associated with the point into a machine-learned category-agnostic instance model. The computing system can determine a first subset of points associated with one or more known instances within an environment based on the class embedding and the background embedding associated with each point of the plurality of points. The computing system can determine a second subset of points associated with one or more unknown instances within the environment based on the first subset of points. And, the computing system can cluster each respective point of the second subset of points into a respective unknown instance of the one or more unknown instances based on the instance embedding and three-dimensional coordinates associated with the respective point. In this manner, the present disclosure presents an improved computing system that can implement an effective open-set instance segmentation method for point clouds. The computing system employs an improved perception system (e.g., a new open-set instance segmentation based system) that is capable of accurately identifying all points in an environment whether or not each point is associated with a known sematic label. As a result, the computing system is able to perceptually group points into unknown instances, for example, in the event that they are not similar to any known categories. In this manner, the computing system can accumulate and utilize newly available information such as, for example, one or more unknown instances, to provide a practical improvement to robotic technology (e.g., autonomous vehicle technology); thereby, improving the functioning of autonomy systems in general by enabling the identification of previously unidentified "unknown" objects.

Furthermore, although aspects of the present disclosure focus on the application of perception techniques described herein to autonomous vehicles, the systems and methods of the present disclosure can be used to identify known or unknown objects in any environment described by sensor point cloud input data. Thus, for example, the systems and methods of the present disclosure can be used to identify objects in a surrounding environment of a robot, and/or a smartphone or other portable computing device by analyzing sensor point cloud input data captured by the robot or device (e.g., through the open-set instance segmentation techniques described herein).

Various means can be configured to perform the methods and processes described herein. For example, a computing system can include data obtaining unit(s), feature data unit(s), instance scoring unit(s), category-agnostic instance unit(s), known object identification unit(s), unknown object identification unit(s), clustering unit(s), data providing unit(s), and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain data, for example, from one or more sensors onboard an autonomous vehicle and/or another system. For example, the means can be configured to receive sensor point cloud input data including a plurality of points. Each point of the plurality of points, for example, can include one or more three-dimensional coordinates.

The means (e.g., feature data unit(s), etc.) can be configured to determine a feature embedding for each respective point of the plurality of points. For example, the means can be configured to determine the feature embedding by inputting each point into a machine-learned feature embedding model. By way of example, the machine-learned feature embedding model can be configured to output a feature embedding based on an input point. The means (e.g., instance scoring unit(s), etc.) can be configured to determine, for each respective point of the plurality of points, one or more anchor-point scores. For example, the means can be configured to input each respective point and the feature embedding associated with the respective point into a machine-learned instance scoring model. The machine-learned instance scoring model, for example, can be configured to output one or more anchor-point scores associated with an input point.

The means (e.g., category-agnostic instance unit(s)) can be configured to determine, for each respective point of the plurality of points, at least one of an instance embedding, a class embedding, or a background embedding. For example, the means can be configured to input each respective point and the feature embedding associated with the respective point into a machine-learned category-agnostic instance model. The machine-learned category-agnostic model, for example, can be configured to output at least one instance embedding, class embedding, or background embedding for the input point and feature representation.

The means (e.g., known object identification unit(s)) can be configured to determine a first subset of points associated with one or more known instances within an environment. The means can determine the first subset of points based, at least in part, on the class embedding and the background embedding associated with each respective point of the plurality of points. Each one of the one or more known instances, for example, can be associated with a respective class-specific semantic label of one or more class-specific semantic labels. For example, the means can be configured to identify the one or more object instances based, at least in part, on the one or more anchor-point scores associated with each respective point of the plurality of points. The means can determine an anchor location for each object instance in the one or more object instances based, at least in part, on the one or more anchor-point scores associated with each respective point of the plurality of points. The means can identify an anchor class embedding for each object instance in the one or more object instances based, at least in part, on the anchor location associated with each object instance. For example, each anchor class embedding can be indicative of a respective class embedding associated with a respective point of the plurality of points. The means can generate a set of anchor points can include one or more object anchor points. Each object anchor point can be indicative of the anchor class embedding for a respective object instance in the one or more object instances. In some implementations, the means can determine the first subset of points based, at least in part, on the one or more object anchor points.

The means (e.g., unknown object identification unit(s)) can be configured to determine a second subset of points associated with one or more unknown instances within the environment. The means can determine the second subset of points based, at least in part, on the first subset of points. For example, the one or more unknown instances can be unassociated with a class-specific semantic label. The means (e.g., clustering unit(s)) can be configured to cluster each respective point of the second subset of points into a respective unknown instance of the one or more unknown instances. For example, the means can cluster each respective point of the second subset of points based, at least in part, on the instance embedding and the three-dimensional coordinates associated with the respective point. In addition, or alternatively, the means (e.g., clustering unit(s)) can be configured to cluster each respective point of the first subset of points with an object instance and/or a background instance based, at least in part, on the class embedding and/or the background embedding associated with the respective point.

The means (e.g., the data providing unit(s)) can be configured to provide data indicative of one or more known objects and/or one or more unknown objects in an environment. For example, the means can provide data indicative of one or more known and/or unknown object to one or more systems onboard an autonomous vehicle. In this manner, the autonomous vehicle control the motion of the autonomous vehicle based, at least in part, on the one or more known objects and the one or more unknown objects.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

FIG. 1 depicts a block diagram of an example system 100 for controlling the navigation of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; an instance detection system 150; and sensor point cloud input data 152.

The operations computing system 104 can be associated with a service entity that can provide one or more vehicle services to a plurality of users, passengers, riders, etc. via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), coordinates of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the status of one or more vehicle systems, the status of one or more autonomous robots, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102; and/or the like. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data another computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, truck, etc.), an aircraft, and/or another type of vehicle (e.g., watercraft, bicycle, scooter, other light electric vehicle, etc.). The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, a sleep mode, and/or the like. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the vehicle, the state of one or more passengers of the vehicle, and/or the state of an environment in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; the human-machine interface 140; and, in some implementations, the instance detection system 150. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 (e.g., sensor point cloud input data 152, etc.) associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, one or more known and/or unknown objects. For example, the one or more known and/or unknown objects can include pedestrians, vehicles, bicycles, lights, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds (e.g., sensor point cloud input data 152, etc.) associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, an instance detection system 150 and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 (e.g., within a sensors field of view, range, etc.) based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., known class, such as a vehicle class, pedestrian class, bicycle class or other known class versus unknown class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems can be combined into one system.

As described in further detail herein with reference to FIGS. 2-7, the system 100 can include an instance detection system 150. By way of example, the instance detection system 150 can be included in or a part of the perception system 124. Although depicted within the vehicle computing system(s) 112, one or more portions of the instance detection system 150 can be included in the operations computing system(s) 104, and/or in the one or more remote computing devices 106. In some implementations, the instance detection system 150 can be configured to obtain sensor point cloud input data 152 (e.g., sensor data 116, etc.) from one or more systems (e.g., sensors 114, etc.) onboard the vehicle 102. As described in further detail herein, the sensor point cloud data 152 can include a light detection and ranging ("LIDAR") point cloud containing a plurality of points. Each point in the plurality of points can include image data (e.g., pixel data, etc.) and/or one or more three-dimensional coordinates (e.g., Cartesian coordinates, polar coordinates, etc.). The instance detection system 150 can utilize one or more machine-learned model to process the sensor point cloud data 152 to determine one or more known and/or unknown objects within an environment such as, for example, the surrounding environment of the autonomous vehicle.

The instance detection system 150 is not limited to vehicle 102 and can be implemented in any device. For example, in some implementations, the instance detection system 150 can be included in or as a part of an autonomous robot or one or more mobile devices. For example, the instance detection system 150 can be included in an autonomous robot and can be configured to identify one or more known or unknown objects within the surrounding environment of the robot. Thus, the technology of this disclosure within the context of vehicle 102 is for example purposes only. As described herein, the technology described herein is not limited to vehicles 102 and the technology can be implemented within other robotic and computing systems.

The motion planning system 128 can determine a motion plan and generate motion plan data 134 for the vehicle 102 based at least in part on the prediction data 132 (the state data 130 and/or other data) and/or the sensor point cloud input data 152. The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems onboard the vehicle 102. The communications system 136 can also be configured to enable the autonomous vehicle to communicate with and/or provide and/or receive data and/or signals from a remote computing device 106 associated with a user, an item (e.g., an item to be picked-up for a courier service), and/or the like. The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., operator's seat, etc.). Additionally, or alternatively, a display device can be viewable by a user of the vehicle 102 that is located in the rear of the vehicle 102 (e.g., a passenger seat).

The vehicle computing system 112 can communicate data between the vehicle 102 and the human-machine interface 140. The data can be communicated to and/or from the vehicle 102 directly and/or indirectly (e.g., via another computing system). For example, in some implementations, the data can be communicated directly from the vehicle computing system 112 to the human-machine interface 140. In addition, or alternatively, the vehicle computing system 112 can communicate with the human-machine interface 140 indirectly, via another computing system, such as, for example, a system of a third party vehicle provider/vendor.

Figure 2:
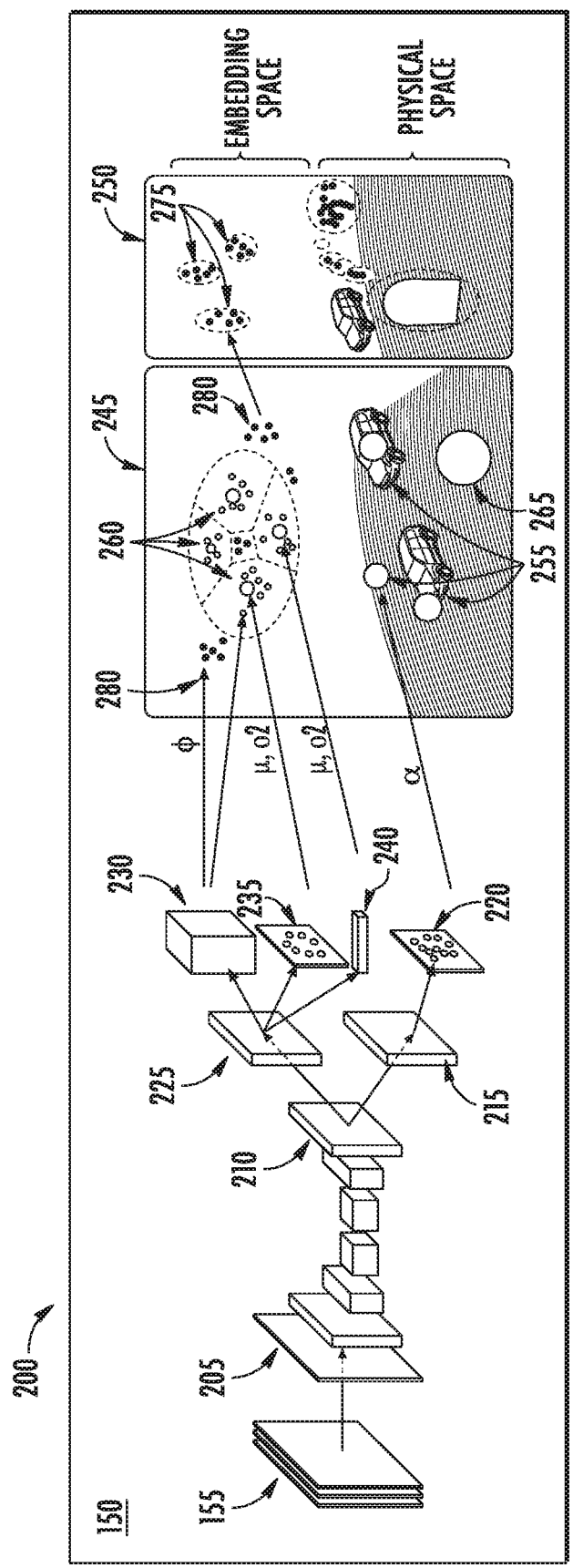
FIG. 2 depicts an example network diagram for identifying unknown instances according to example implementations of the present disclosure.

FIG. 2 depicts an example network diagram 200 for identifying unknown instances according to example implementations of the present disclosure. The network diagram 200 illustrates an example approach to learning a category-agnostic embedding space in which points can be clustered into instances irrespective of their semantics. For example, FIG. 2 depicts an example convolutional network including at least three components. The three components can include a shared backbone feature extractor such as a machine-learned feature embedding model 205; a detection head such as a machine-learned instance scoring model 215 configured to detect anchors representing instances of known things; and/or an embedding head such as a machine-learned category-agnostic instance model 225 configured to predict instance-aware features for each point as well as prototypes for each object anchor and/or background class.

The instance detection system 150 can receive point could input data. The point cloud input data can include, for instance, sensor point cloud input data 152. By way of example, the sensor point cloud input data 152 can be obtained by one or more sensors (e.g., LiDAR sensors, cameras, etc.) onboard an autonomous vehicle, autonomous robot, etc. The sensor point cloud input data 152 can include a light detection and ranging ("LIDAR") point cloud containing a plurality of points. Each point in the plurality of points can include image data (e.g., pixel data, etc.) and/or one or more three-dimensional coordinates (e.g., Cartesian coordinates, polar coordinates, etc.).

In some implementations, the sensor point cloud input data 152 can include a bird's eye view (BEV) rasterized image such as, for example, of a LiDAR point cloud $\chi=\{(x_i, y_i, z_i)\}_{i=1}^{N}$ centered on an auto nous vehicle. For example, the sensor point cloud input data 152 can be represented as a two-dimensional image grid. For instance, the space can be discretized into a two-dimensional image grid. For instance, $\chi$ can be voxelated into a three-dimensional occupancy grid using reversed trilinear interpolation. In this manner, occupancy along the vertical axis of the two-dimensional grid can be treated as multi-dimensional features. Moreover, in some implementations, the sensor point cloud input data 152 can include data from a plurality of LiDAR frames stacked along a feature channel to implicitly exploit temporal contexts. In some implementations, localization techniques can be used to alleviate misalignment across the plurality of LiDAR frames due to the motion of the vehicle and/or robot.

The instance detection system 150 can feed the sensor point cloud input data 152 into machine-learned model(s) to identify one or more known and unknown instances within an environment. As described in further detail below, the machine-learned model(s) can include a backbone feature network (e.g., a machine-learned feature embedding model 205) with two branches. A first branch can include a machine-learned instance scoring model 215 (e.g., a detection head) configured to detect known instances (e.g., instances associated with known semantic labels) within an environment. A second branch can include a machine-learned category-agnostic instance model 225 (e.g., an embedding head) configured to provide point embeddings for each point in the sensor point cloud input data 152. For example, the machine-learned category-agnostic instance model 225 can branch into three outputs. A first output can include a class embedding 235 (e.g., a BEV "thing" embedding) used as a prototypical instance embedding for known classes; a second output can include an instance embedding 230 (e.g., an instance-aware point embedding); and a third output can include a background embedding 240 (e.g., a "stuff" embedding) for known background classes.

In some implementations, the machine-learned feature embedding model 205, the machine-learned instance scoring model 215, and/or the machine-learned category-agnostic instance model 225 can include one or more portions of a neural network. For example, in some implementations, the machine-learned feature embedding model 205, the machine-learned instance scoring model 215, and/or the machine-learned category-agnostic instance model 225 can be jointly trained end-to-end via backpropagation. By way of example, the neural network can be trained utilizing a loss function that measures a combination of detection and embedding losses (e.g., prototypical association loss) such as:

$$\mathcal{L} = \lambda_{det}\ell_{det} + \lambda_{emb}\ell_{emb}$$

where $\ell_{det}$ the detection loss, $\ell_{emb}$ is the embedding loss, $\lambda$'s are their associated weights. In some implementations, $\lambda$, can be set to 1 and the loss function can be fully differentiable with respect to the neural network parameters such that the machine-learned models can be trained using standard back-propagation algorithms.

In addition, or alternatively, standard multi-tack loss functions can be used to train the machine-learned instance scoring model 215 (e.g., detection head). In particular, for object classification, binary cross-entropy with online negative hard mining, where positive and negative BEV pixels are determined by their distances to an object center can be used. For example, for bounding box regression, a combination of IoU loss for box locations and sizes and SmoothL1 loss for box orientations on predictions at positive pixels can be used.

Moreover, in some implementations, standard cross-entropy loss functions can be used to encourage points to be assigned to a correct prototype. For example, during training a set of prototypes such as, for example, $\mathcal{P}_{gt}$, which can be the union of $\mathcal{P}_{stuff}$ and a set of object (e.g., thing) prototypes obtained by bilinearly interpolating $\Phi_{thing}$ around ground truth object centers can be gathered. The instance detection system 150 can compute point-to-prototype association scores $\{\{\hat{y}_i\}_{i=1}^N\}$ with respect to $\mathcal{P}_{gt}$, and normalize each $\hat{y}_i$ using the softmax function. The instance detection system 150 can calculate the cross-entropy loss by:

$$\ell_{proto} = -\frac{1}{N}\sum_{i=1}^{N}\sum_{k=1}^{|\mathcal{P}_{gt}|+1} y_{i,k}\log\hat{y}_{i,k}$$

where each $y_i$ can be a one-hot vector indicating ground truth associations. In some implementations, performance can be improved by applying discriminative loss functions on the point embeddings $\{\phi\}_{i=1}^N$.

The instance detection system 150 can determine a feature embedding 210 for each respective point of the plurality of points (e.g., of the sensor point cloud input data 152) by inputting each point into the machine-learned feature embedding model 205. For example, the instance detection system 150 can input each respective point of the plurality of points into the machine-learned feature embedding model 205 to obtain a feature embedding 210 for the respective point. By way of example, the machine-learned feature embedding model 205 can include a customized lightweight (e.g., two-dimensional) feature pyramid network and the feature embedding can include a feature hierarchy that consists of three scales (e.g., of input resolution: ¼, ⅛, and 1/16). The multi-scale features can be upsampled to the ¼ scale and fused via a residual connection to output a C×H×W feature map, where C is the number feature channels, and H and W is the height and width of the feature map respectively. For example, the multi-scale feature maps can be densely connected at the final residual block output to exchange multi-scale information. In some implementations, the multi-scale feature maps can be followed by an additional convolutional layer to aggregate the information. In addition, the two coarse scales can be merged into a final output feature map using lateral residual connections. In this manner, the instance detection system 150 can output a feature embedding 210 for each point indicative of one or more point features.

The instance detection system 150 can determine one or more anchor-point scores 220 for each respective point of the plurality of points. The instance detection system 150 can determine the one or more anchor-point scores 220 by inputting each respective point and the feature embedding 210 associated with the respective point into the machine-learned instance scoring model 215. For example, the instance detection system 150 can input each respective point of the plurality of points and a respective feature embedding 210 associated with the respective point into the machine-learned instance scoring model 215 to obtain the one or more anchor-point scores 220 for the respective point.

The machine-learned instance scoring model 215 can include a detection head. The detection head can include four 3×3 convolutional layers, followed by a 1×1 convolutional layer. For each point in the plurality of points and for each class in $\mathbb{C}_{thing}$, the detection head can predict ($\alpha$, dx, $d\mathcal{y}$, w, $\ell$, sin(2$\theta$), cos(2$\theta$)), where $\alpha$ is an anchor confidence score, (dx, $d\mathcal{y}$) is the position offsets to its object center, and the rest parameterize the geometry of a bounding box. During inference, the instance detection system can remove anchors with scores less than a threshold $\tau$ to obtain a set of anchors $\mathcal{A}_\tau$. Thus, the one or more anchor-point scores can represent a likelihood of an anchor presence at a specific point for a known semantic class. In this manner, the one or more anchor-point scores 220 for the respective point can be indicative of a likelihood that the respective point is associated with one or more known semantic classes in a closed set of semantic classes. By way of example, given point i and a class c, the score can be defined as $\alpha_{i,c}$.

The instance detection system 150 can obtain a plurality of additional point embeddings for each point in the plurality of points. For example, the instance detection system 150 can determine, for each respective point of the plurality of points, at least one of an instance embedding 230, a class embedding 235, and/or a background embedding 240 by inputting each respective point and the feature embedding 210 associated with the respective point into the machine-learned category-agnostic instance model 225. By way of example, the instance detection system 150 can input each respective point of the plurality of points and a respective feature embedding 210 associated with the respective point into the machine-learned category-agnostic instance model 225 to obtain the instance embedding 230, the class embedding 235, and/or the background embedding 240 for the respective point.

The machine-learned category-agnostic instance model 225 can include an embedding head. The embedding head can include a four-layer convolutional neural network with 3×3 filters. The four-layer 3×3 filters can be followed by three separate 1×1 convolutional layers. Each separate 1×1 convolutional layer can output a different embedding branch. For example, a first convolutional layer (e.g., a "point embedding header") can output the instance embedding 230; a second convolutional layer (e.g., a "thing" embedding head) can output the class embedding 235; and a third convolutional layer (e.g., a "stuff" embedding head) can output the background embedding 240.

The instance embedding 230 can include an instance-aware point embedding. In some implementations, the first convolutional layer can output a respective instance embedding 230 for each point in the plurality of points. For example, each instance embedding 230 can include an embedding vector for a point in the three-dimensional voxel space. By way of example, the first convolutional layer can output feature $\Phi_{point} \in \mathbb{R}^{(F \times Z) \times H \times W}$, where F is the dimension of the embedding space, and Z is the number of bins along the gravitational z-axis. The instance detection system 150 can extract an embedding $\Phi_i$ from $\Phi_{point}$ via trilinear interpolation for each point i in $\chi$.

The class embedding 235 can include a feature vector associated with one or more known object-classes within the environment. For example, the class embedding 235 can include one or more predicted prototypical instance features. By way of example, the second convolution layer can encode a mean feature vector $\mu$ and a scalar variance $\sigma^2$ for each object-class in the one or more object-classes. For example, the second convolutional layer can output features $\Phi_{point} \in \mathbb{R}^{(F+1) \times H \times W}$. For each anchor k in $\mathcal{A}_k$, the instance detection system 150 can extract its prototype $(\mu_k, \sigma_k^2) \in \mathbb{R}^F \times \mathbb{R}$ by bilinearly interpolating $\Phi_{thing}$ around the anchor's object center. This, in turn, can yield a set of thing prototypes $\mathcal{P}_{thing}$.

In addition, the background embedding 240 can include a feature vector associated with one or more classes (e.g., background classes and/or any other semantic classes) within the current environment and/or a previous environment. By way of example, the background embedding 240 can be applied to any of a plurality of classes such as one or more background classes of the current scene, one or more background classes of a previous scene, and/or any other semantic class associated with the current scene and/or a previous scene. For example, the background embedding 240 can include an F-dimensional mean feature vector and a scalar variance for each of the one or more background classes. By way of example, the third convolutional network can include global average pooling and a 1×1 convolution to obtain features $\phi_{stuff} \in \mathbb{R}^{C \times 1 \times 1}$. For each stuff class $c \in \mathbb{C}_{stuff}$, the instance detection system can apply a linear layer on $\phi_{stuff}$ to predict its prototype $(\mu_c, \sigma_c^2) \in \mathbb{R}^F \times \mathbb{R}$. This, in turn, can yield a set of stuff prototypes $\mathcal{P}$ stuff.

The instance detection system 150 can identify one or more object instances within the environment. For example, the instance detection system 150 can identify each object instance based, at least in part, on the one or more anchor-point scores 220 associated with each respective point of the plurality of points. By way of example, the one or more anchor-point scores 220 can represent a likelihood of an anchor presence at a specific point for a known sematic class in a closed set of semantic classes. In some implementations, the instance detection system 150 can identify a particular object instance when at least one point in the plurality of points is associated with at least one anchor-point score 210 representing a high likelihood of an anchor presence for the particular object instance. In this manner, the instance detection system 150 can identify the presence of one or more object instances within the environment before analyzing the one or more class embeddings 235 associated with the plurality of points.

The one or more object instances 255 can include one or more objects within the environment. For example, an object instance 255 can include one or more dynamic objects (e.g., moving objects (actors) such as vehicles, pedestrians, bicycles, etc.) and/or one or more static objects (e.g., non-moving objects such as street signs, construction cones, non-moving vehicles/pedestrians/bicycles, etc.). The one or more object instances 255 can be associated with a closed-set of object-specific semantic labels. For example, the closed-set of object-specific semantic labels can include a closed-set of known classes that have been previously seen (e.g., by the machine-learned model(s)) during training. In this manner, the machine-learned model(s) can be trained to identify and classify a point with an object-specific semantic label, with high confidence, based on features previously detected during training.

The instance detection system 150 can determine an anchor location for each object instance in the one or more object instances 255. For example, each anchor location can be determined based, at least in part, on the one or more anchor-point scores 220 associated with each point in the plurality of points. For example, given the anchor-point scores 220 (e.g., learned class-aware anchor maps) and the class embeddings 235 (e.g., dense embedding maps from the machine-learned model(s)), the instance detection system 150 can determine class-specific anchor locations using non-maximal suppression. In addition, the instance detection system 150 can identify an anchor class embedding for each object instance in the one or more object instances 255 based, at least in part, on the anchor location associated with each object instance. For example, each anchor class embedding can be indicative of a respective class embedding 235 associated with a respective point in the plurality of points. By way of example, the instance detection system 150 can determine each class's mean $\mu_k$ and variance $\sigma_k$ (e.g., class embedding 220) by bilinear interpolating the class embeddings 220 associated with one or more points in the plurality of points (e.g., the class embedding map) around the predicted anchor location.

The instance detection system 150 can generate a set of anchor points based on the identified anchor class embeddings for each object instance in the one or more object instances 255. For example, the set of anchor points can include one or more object anchor points. Each object anchor point can be indicative of an anchor class embedding for a respective object instance in the one or more object instances 255. In addition, or alternatively, the set of anchor points can include one or more background anchor points. Each of the one or more background anchor points can be indicative of a background embedding 240 associated with a respective point in the plurality of points. For example, the instance detection system 150 can concatenate one or more background anchor points to the set of anchor points. By way of example, the instance detection system 150 can obtain the background embeddings 240 output from the machine-learned category-agnostic instance model 225 and concatenate them with the class embeddings 235 associated with the one or more object instances 255. In this manner, the instance detection system 150 can build a final list of prototype anchors including one or more class embeddings 235 and one or more background embeddings 240. For example, the set of anchor points can include a set of $\{\mu_k, \sigma^2\}_{k=1, \ldots, K+M}$, where K is the number of known object-classes and M is the number of known background-classes within the environment.

The instance detection system 150 can determine a first subset of points (e.g., from the plurality of points) associated with the one or more known instances within the environment. The one or more known instances, for example, can be associated with a class-specific (e.g., object class-specific, background class-specific, etc.) semantic label. By way of example, the one or more known instances can include one or more object classes and/or one or more background classes that have been previously identified by the machine-learned model(s). For example, the first subset of points can be determined based, at least in part, on the class embedding 235 and the background embedding 240 associated with each respective point of the plurality of points. In this manner, the first subset of points can include an object subset of points 260 and a background subset of points 270.

The object subset of points 260, for example, can be associated with the one or more object instances 255 within the environment. The instance detection system 150 can determine the object subset of points 260 based, at least in part, on the one or more object anchor points in the set of anchor points. By way of example, the instance detection system 150 can determine the object subset of points 260 based, at least in part, on the respective class embedding 235 associated with each respective point of the plurality of points. In this way, the object subset of points 260 can include each respective point with an associated class embedding 235 that is associated with a respective object instance in the one or more object instances 255.

In addition, the background subset of points 270 can be associated with one or more background instances 265 within the environment. For example, a background instance can include one or more background travel features, such as, for example, roads, buildings, medians, fences, etc. The one or more background instances 265 can be associated with a closed-set of background-specific semantic labels. For example, the closed-set of background-specific semantic labels can include a closed-set of known background classes that have been previously observed (e.g., by the machine-learned model(s)) during training. The instance detection system 150 can determine the background subset of points 270 based, at least in part, on the one or more background anchor points in the set of anchor points. For example, the instance detection system 150 can determine the background subset of points 270 based, at least in part, on the background embedding 240 associated with each respective point of the plurality of points.

More particularly, the first subset of points can be determined by comparing each anchor point in the set of anchor points to each point in the plurality of points. For example, the instance detection system 150 can determine a point-anchor association score for each respective point of the plurality of points. The point-anchor association score can be based, at least in part, on a comparison between the class embedding 235 and/or the background embedding 240 associated with the respective point and the set of anchor points. For instance, the point-anchor association score can be indicative of a similarity between the respective point (e.g., a class embedding 235 and/or a background embedding 240 associated with the respective point) and at least one anchor point in the set of anchor points. For example, the point-anchor association score can be designed to be proportional to each point's log-likelihood.

For example, the instance detection system 150 can apply non-maximum suppression to $\mathcal{P}_{thing}$ to obtain an unique set of thing prototypes $\mathcal{P}_{thing}$. For example, the set of anchor points can be denoted as $\mathcal{P}_{all} = \mathcal{P}_{thing} \cup \mathcal{P}$ stuff as the final set of all thing and stuff prototypes. The first subset of points can be determined based, at least in part, on the point-anchor association score associated with each respective point of the plurality of points. For example, the instance detection system 150 can determine point-to-prototype association score for each point i in the plurality of points $\chi$ with respect to every prototype k in $\mathcal{P}_{all}$ as follows:

$$\hat{y}_{i,k} = -\frac{\|\phi_i - \mu_k\|^2}{2\sigma_k^2} - \frac{F}{2}\log\sigma_k^2$$

For example, each respective point of the first subset of points can be associated with a point-anchor association score within a similarity threshold. The similarity threshold, for example, can include a learnable distance parameter U (e.g., a learnable global constant). In some implementations, the learnable distance parameter can correspond to its score $\hat{y}_{i,|\mathcal{P}_{all}|+1}$ of not associating with any prototype in $\mathcal{P}_{all}$. Any point associated with a point-anchor association score within the similarity threshold can be included in the first subset of points.

The instance detection system 150 can cluster each respective point of the object subset of points 260 into a respective object instance in the one or more object instances 255 based, at least in part, on the respective class embedding 235 corresponding to each respective point. For example, during closed-set segmentation 245, the instance detection system 150 can identify a respective object instance in the one or more object instances 255 that is most similar to a respective point based, at least in part, on the point-anchor association score associated with the respective point. The instance detection system 150 can assign a known semantic class label indicative of the respective object instance to the respective point. For example, the instance detection system 150 can assign a known semantic class label indicative of the respective object instance to the respective point.

The instance detection system 150 can determine a second subset of points 280 including one or more points in the plurality of points. For example, during open-set segmentation 250, the instance detection system 150 can identify one or more points included in the second subset of points 280. The second subset of points 280 can be associated with one or more unknown instances 275 within the environment. The instance detection system 150 can determine the second subset of points 280 based, at least in part, on the first subset of points. For example, the second subset of points 280 can include every point in the plurality of points that are not included in the first subset of points.

For example, each point in the plurality of points can be assigned to a known class or, in the event that a point's association with all known anchors is not confident enough, an "unknown" class. For example, the instance detection system 150 can associate each point in the plurality of points towards its k-nearest-neighbor anchor class embedding and all anchor background embeddings M to accelerate inference speed. The instance label can be determined by taking the argmax per each point i over the association score. In this manner, the instance detection system 150 can assign one or more closed-set instance labels to most of the points in the plurality of points. The remaining points can be labelled as "unknown" points. Thus, the one or more unknown instances 175 can include instances that are not associated with a respective class-specific semantic label of one or more class-specific sematic labels within a closed set of semantic labels. For example, each unknown instance can include a dynamic object (e.g., moving objects (actors) such as animals, unique vehicles, etc.) and/or a static object (e.g., nonmoving objects such as unique trees, branches, etc.) that has not been previously observed by the machine-learned model(s).

The instance detection system 150 can assign an unknown semantic class label indicative of a respective unknown instance in the one or more unknown instances 275 to each point in the second subset of points 280. In addition, the instance detection system 150 can cluster each respective point of the second subset of points 280 into the respective unknown instance. For example, the instance detection system 150 can cluster each respective point based, at least in part, on the instance embedding 230 and the three-dimensional coordinates associated with the respective point. By way of example, for all unknown points (e.g., in the second subset of points 230), the instance detection system 150 can conduct a Density-based spatial clustering of applications with noise ("DBSCAN") based clustering. For instance, the pairwise squared distance used in DBSCAN can include a convex combination of the instance embedding squared distance and its three-dimensional location squared distance. For example:

$$d_{ij}^2 = \beta\|x_i - x_j\|^2 + (1+\beta)\|\phi_i - \phi_j\|^2.$$

As a result of the clustering, each unknown point can be assigned to an unknown instance in the one or more unknown instances 275. Combining this with the closed-set instance results, the instance detection system 150 can assign instance labels to every point in the plurality of points, regardless of whether the instance is associated with a known category.

Figure 3:
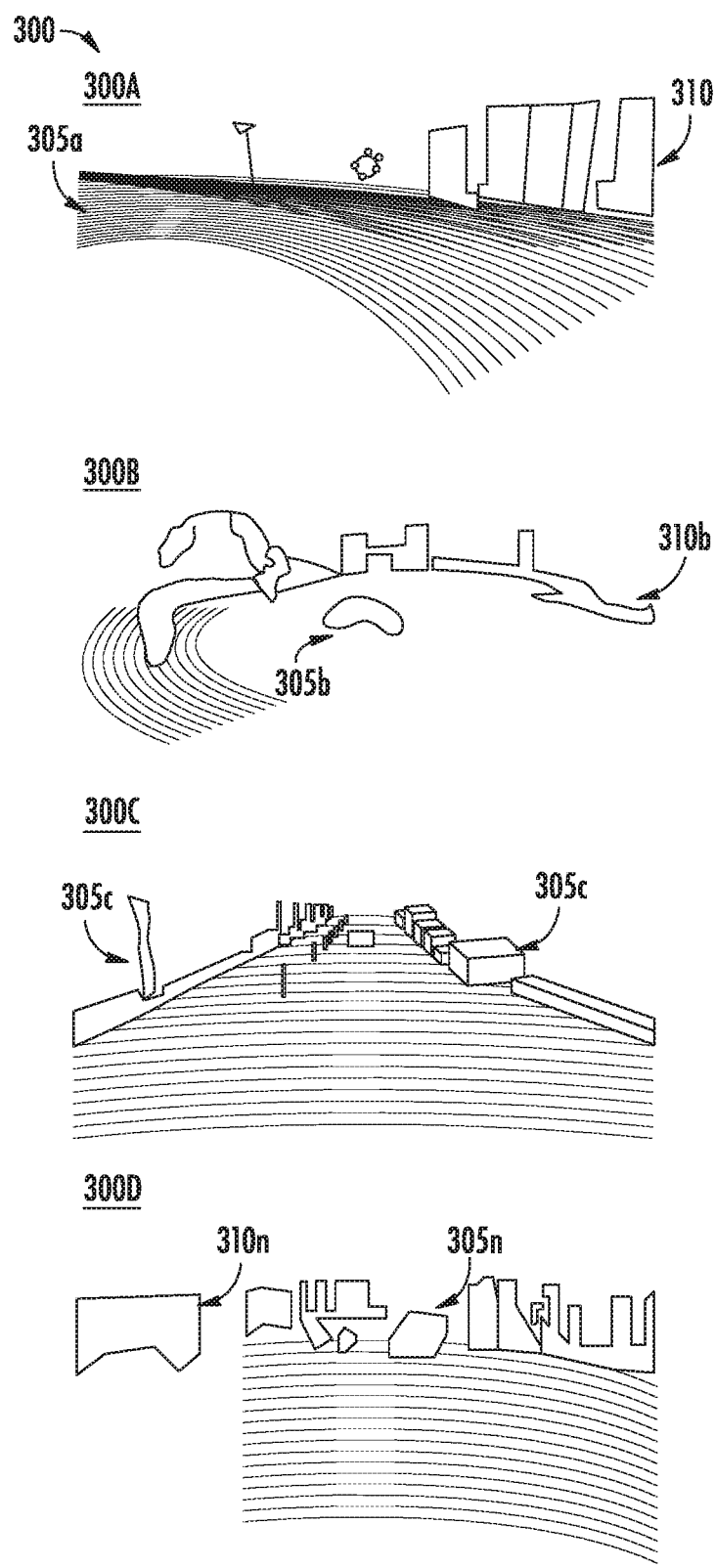
FIG. 3 depicts example feature embeddings with labels according to example implementations of the present disclosure.

By way of example, FIG. 3 depicts example frames (e.g., 300(A-D)) with one or more known 305 and unknown labels 310 according to example implementations of the present disclosure. By way of example, the sensor point cloud input data 152 can represent a frame (e.g., frame(s) 300A, 300B, 300C, 300D, etc.) with one or more known objects and one or more unknown instances. The instance detection system 150 can label each known object with a known object label (e.g., known object label(s) 305). In addition, the instance detection system 150 can assign each unknown instance with an unknown instance label (e.g., unknown instance label(s) 310). For instance, frame 300A can include one or more known objects assigned known object labels 305(a-n) and one or more unknown instances assigned unknown instance labels 310(a-n). As another example, scene 300B can include one or more known objects assigned known object labels 305(a-n) and one or more unknown instances assigned unknown instance label(s) 310(a-n). Scene 300C can include one or more known objects assigned known object labels 305(a-n) and one or more unknown instances assigned unknown instance label(s) 310(a-n). And, scene 300D can include one or more known objects assigned known object labels 305(a-n) and one or more unknown instances assigned unknown instance label(s) 310(a-n).

The known object label(s) 305(a-n) for each scene 300 (A-D) can include one or more different and/or one or more similar known semantic labels included in a close-set of semantic classes. For example, one or more frames(s) (e.g., frames(s) 300(A-D)) can include one or more similar objects. In some implementations, the one or more similar objects can be assigned the same semantic label. In addition, or alternatively, one or more frames(s) (e.g., scene(s) 300 (A-D)) can include one or more different objects. In some implementations, each of the one or more different objects can be assigned a different semantic label. Moreover, the unknown instance label(s) 310(a-n) for each frame 300(A-D) can include one or more different and/or one or more similar unknown semantic labels not included in the closed-set of semantic labels. For example, in some implementations, each unknown instance label (e.g., 310(a-n)) can include the same unknown semantic label. By way of example, each unknown semantic label can be indicative of a general unknown instance. In some implementations, the unknown instance label (e.g., 310(a-n)) can include one or more similar unknown instances. The similar unknown instances can be assigned an unknown semantic label indicative of a specific unknown instance.

Figure 4:
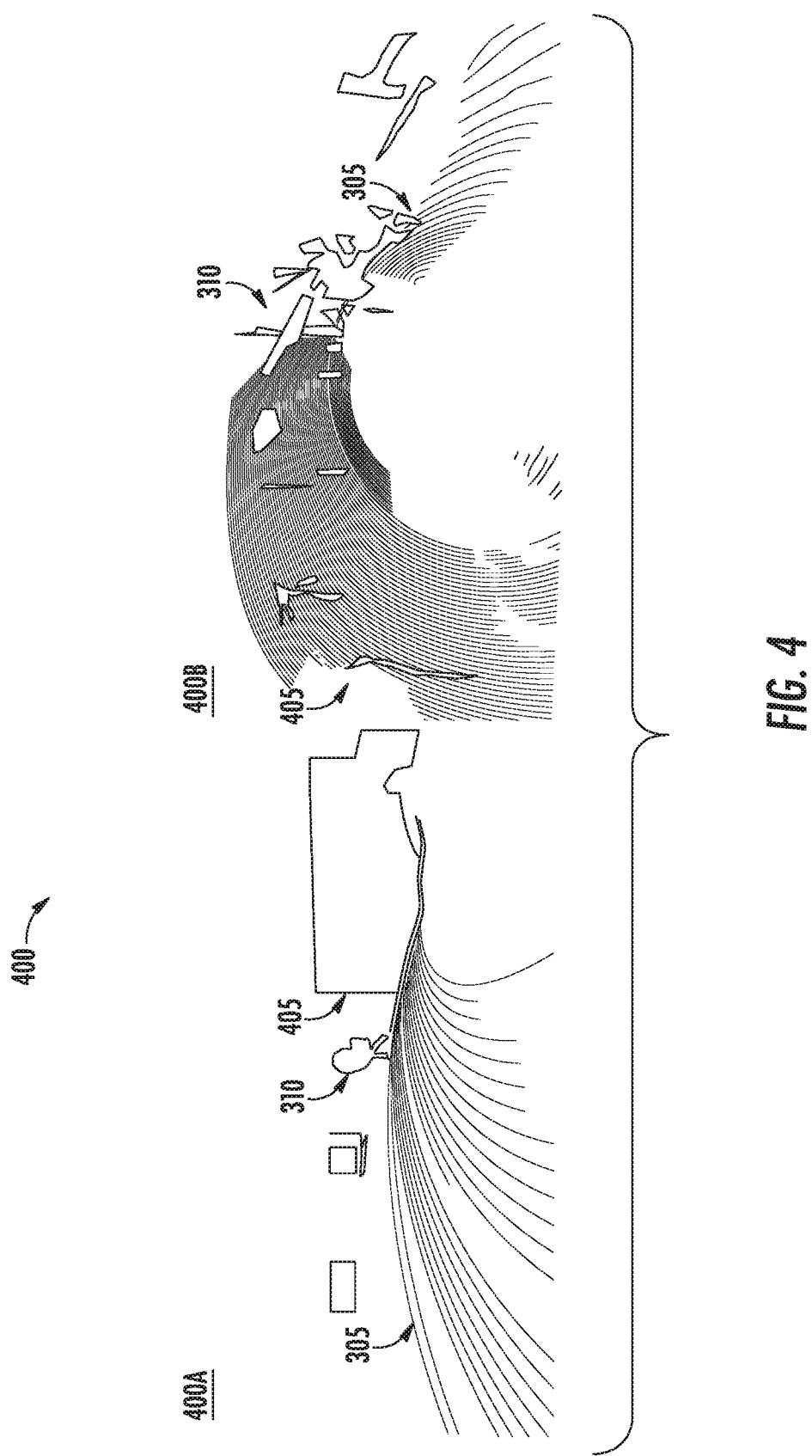
FIG. 4 depicts an example feature output according to example implementations of the present disclosure.

As another example, FIG. 4 depicts example frames 400 with one or more known object labels 305, known background labels 405, and unknown object labels 310 according to example implementations of the present disclosure. In some implementations, the sensor point cloud input data 152 can represent a frame (e.g., frame(s) 400A, 400B, etc.) with one or more known objects, one or more unknown instances, and/or one or more backgrounds. The instance detection system 150 can label each known object with a known object label (e.g., known object label(s) 305); each unknown instance with an unknown instance label (e.g., unknown instance label(s) 310); and each background with a background label (e.g., background label 405).

By way of example, scene 400A can include one or more known objects, unknown objects, and/or backgrounds. Each known object can be assigned a known object label 305; each unknown instance can be assigned an unknown instance label 310; and, each background can be assigned a background label 405. As another example, scene 400B can include one or more known objects, unknown objects, and/or backgrounds. Each known object can be assigned a known object label 305; each unknown instance can be assigned an unknown instance label 310; and, each background can be assigned a background label 405.

More particularly, the sensor point cloud input data 152 (e.g., input point set) can be denoted as $\chi = \{x\}_{i=1}^{N}$ where the sensor point cloud input data includes a set of $\mathcal{N}$ points and where each $x_i \in \mathbb{R}^D$ is an input feature for point i. Given a set of instance ids $\mathbb{I}$ and a set of open-set semantic labels $\mathbb{O}$, the present disclosure provides a function f mapping each input feature $x_i \in \chi$ to a tuple $(y_i, z_i) \in \mathbb{I} \times \mathbb{O}$. As discussed in further detail below, in some implementations, the set of open-set semantic labels $\mathbb{O}$ can be partitioned into two disjoint subsets $\mathbb{C}$ and $\{\bot\}$, where $\mathbb{C}$ can be a set of known classes and ™ can be a semantic label for one or more unknown classes. In addition, or alternatively, the set of known classes E can be further divided into $\mathbb{C}_{thing}$ and $\mathbb{C}_{stuff}$. For example, the $\mathbb{C}_{thing}$ semantic classes can correspond to one or more known object (e.g., thing) classes (e.g., vehicles, pedestrians, etc.) and $\mathbb{C}_{stuff}$ semantic classes can correspond to one or more known background (e.g., stuff) classes (e.g., roads, sidewalks, etc.). In some implementations, the instance detection system 150 can assign every point with the same instance id to the same semantic label. Moreover, in some implementations, the instance ids of stuff points can be ignored. In this manner, the instance detection system 150 can assign labels to individual instances of unknown classes in addition to known objects and backgrounds.

In this way, the instance detection system 150 can cluster each point included in the sensor point cloud input data 152 into a specific instance (e.g., known object instance, background instance, unknown instance, etc.). As a result, the sensor point cloud input data 152 can be segmented into one or more instances regardless of whether a known semantic label exists for the instance.

In this manner, the instance detection system 150 and/or one or more systems onboard an autonomous vehicle (e.g., a vehicle computing system 112, perception system 124, etc.) can identify one or more known and one or more unknown objects within the surrounding environment of the vehicle 102. For example, one or more known objects (e.g., instance(s) 255) can be identified based, at least in part, on the assigned known semantic class labels. In addition, or alternatively, one or more unknown objects (e.g., instance(s) 275) can be identified based, at least in part, on the assigned unknown sematic class labels. In some implementations, the instance detection system 150 and/or one or more systems onboard an autonomous vehicle (e.g., a vehicle computing system 112, motion planning system 128, etc.) can control of the motion of the vehicle 102 based, at least in part, on the one or more known objects (e.g., instance(s) 155) and the one or more unknown objects (e.g., instance(s) 175). For example, in some implementations, the instance detection system 150 and/or one or more systems onboard the vehicle 102 (e.g., a vehicle computing system 112, perception system 124, etc.) can communicate data indicative of one or more known and/or unknown objects to a motion planning system 128 onboard the vehicle 102. In this manner, the motion planning system 128 can determine a motion plan based, at least in part, on the identified known and unknown objects within the surrounding environment of the vehicle 102.

Figure 5:
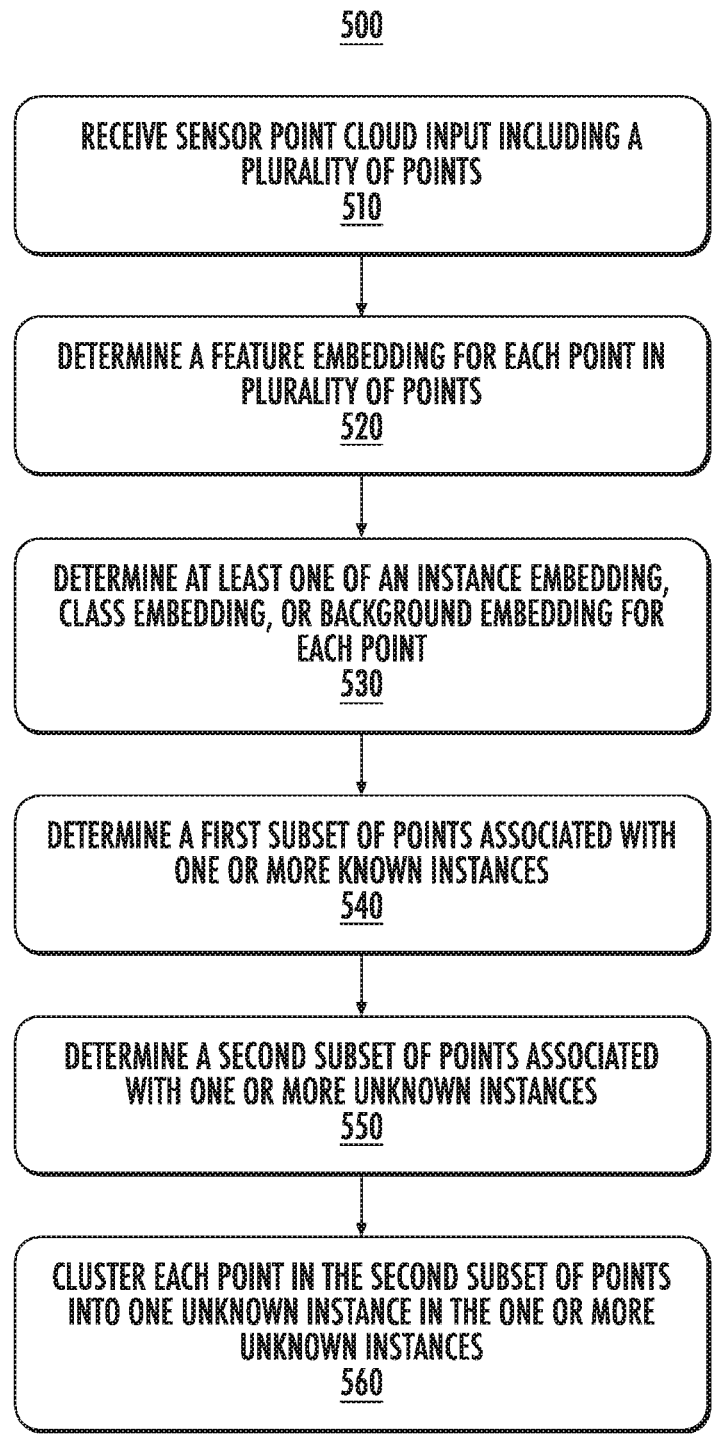
FIG. 5 depicts a flowchart diagram of an example method of clustering unknown objects according to example implementations of the present disclosure.

FIG. 5 depicts a flowchart diagram of an example method of clustering unknown objects 275 according to example implementations of the present disclosure. One or more portion(s) of the method 500 can be implemented by a computing system that includes one or more computing devices such as, for example, the computing systems described with reference to the other figures (e.g., the vehicle computing system 112, the instance detection system 150, the operations computing system 104, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1, 7-8, etc.), for example, to control the motion of a vehicle based on unknown objects. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for exemplary illustrated purposes and is not meant to be limiting. One or more portions of method 500 can be performed additionally, or alternatively, by other systems.

At (510), the method 500 can include receiving point cloud input data 152. For example, a computing system (e.g., vehicle computing system 112, perception system 124, instance detection system 150, etc.) can receive sensor point cloud input data 152. For instance, the computing system can receive sensor point cloud input data 152 including a plurality of points. Each point in the plurality of points can include one or more three-dimensional coordinates. The sensor point cloud data 152 can be associated with an environment. By way of example, in some implementations, the sensor point cloud data 152 can be associated with a surrounding environment of an autonomous vehicle.

At (520), the method 500 can include determining a feature embedding 210 for each point in the plurality of points. For instance, a computing system (e.g., vehicle computing system 112, perception system 124, instance detection system 150, etc.) can determine a feature embedding 210 for each point in the plurality of points. For instance, the computing system can determine a feature embedding 210 for each respective point of the plurality of points by inputting each point into a machine-learned feature embedding model 205.

At (530), the method 500 can include determining at least one of an instance embedding 230, class embedding 235, and/or a background embedding 240 for each point in the plurality of points. For example, a computing system (e.g., vehicle computing system 112, perception system 124, instance detection system 150, etc.) can determine at least one or an instance embedding 230, class embedding 235, and/or background embedding 240 for each point in the plurality of points. For instance, the computing system can determine, for each respective point of the plurality of points, at least one of an instance embedding 230, a class embedding 235, and/or a background embedding 240 by inputting each respective point and the feature embedding 210 associated with the respective point into a machine-learned category-agnostic instance model 225.

At (540), the method 500 can include determining a first subset of points associated with one or more known instances. For example, a computing system (e.g., vehicle computing system 112, perception system 124, instance detection system 150, etc.) can determine a first subset of points associated with one or more known instances. For instance, the computing system can determine a first subset of points associated with one or more known instances within an environment based, at least in part, on the class embedding 235 and the background embedding 240 associated with each respective point of the plurality of points. For example, the each one of the one or more known instances can be associated with a respect class-specific semantic label of one or more class-specific semantic labels.

By way of example, the computing system can determine a point-anchor association score for each respective point of the plurality of points based, at least in part, on a comparison between the class embedding 235 and the background embedding 240 associated with the respective point and a set of anchor points. For example, the point-anchor association score can be indicative of a similarity between the respective point and at least one anchor point in the set of anchor points. In some implementations, the computing system can determine the first subset of points based, at least in part, on the point-anchor association score associated with each respective point of the plurality of points. For example, each respective point of the first subset of points can be associated with a point-anchor association score within, above, and/or below a similarity threshold.

At (550), the method 500 can include determining the second subset of points 280 associated with one or more known instances 275. For example, a computing system (e.g., vehicle computing system 112, perception system 124, instance detection system 150, etc.) can determine a second subset of points 280 associated with one or more known instances 275. For instance, the computing system can determine a second subset of points associated with one or more unknown instances within the environment based, at least in part, on the first subset of points. For example, the one or more unknown instances can not be associated with a respective class-specific semantic label of one or more class-specific semantic labels.

In some implementations, the computing system can determine an object subset of points 260 associated with one or more object instances 255 within the environment based, at least in part, on the class embedding 235 associated with each respective point of the plurality of points. For example, the one or more object instances 255 can be associated with an object-specific semantic label. In addition, or alternatively, the computing system can determine a background subset of points 270 associated with one or more background instances 265 within the environment based, at least in part, on the background embedding 240 associated with each respective point of the plurality of points. For example, the one or more background instances 265 can be associated with a background-specific semantic label.

At (560), the method 500 can include clustering each point in the second subset of points 280 into one unknown instance in the one or more unknown instances 275. For example, a computing system (e.g., vehicle computing system 112, perception system 124, instance detection system 150, etc.) can cluster each point in the second subset of points 280 into one unknown instance in the one or more unknown instances 275. For instance, the computing system can cluster each respective point of the second subset of points into a respective unknown instance in the one or more unknown instances based, at least in part, on the instance embedding 230 and the three-dimensional coordinates associated with the respective point. By way of example, the computing system can assign an unknown semantic class label indicative of the respective unknown instance to the respective point.

In addition, or alternatively, the computing system can identify one or more known objects and/or one or more unknown objects within the environment (e.g., a surrounding environment of an autonomous vehicle) based, at least in part, on known semantic class labels and the unknown sematic class labels. The computing system can control the motion of the autonomous vehicle based, at least in part, on the one or more known objects and the one or more unknown objects.

Figure 6:
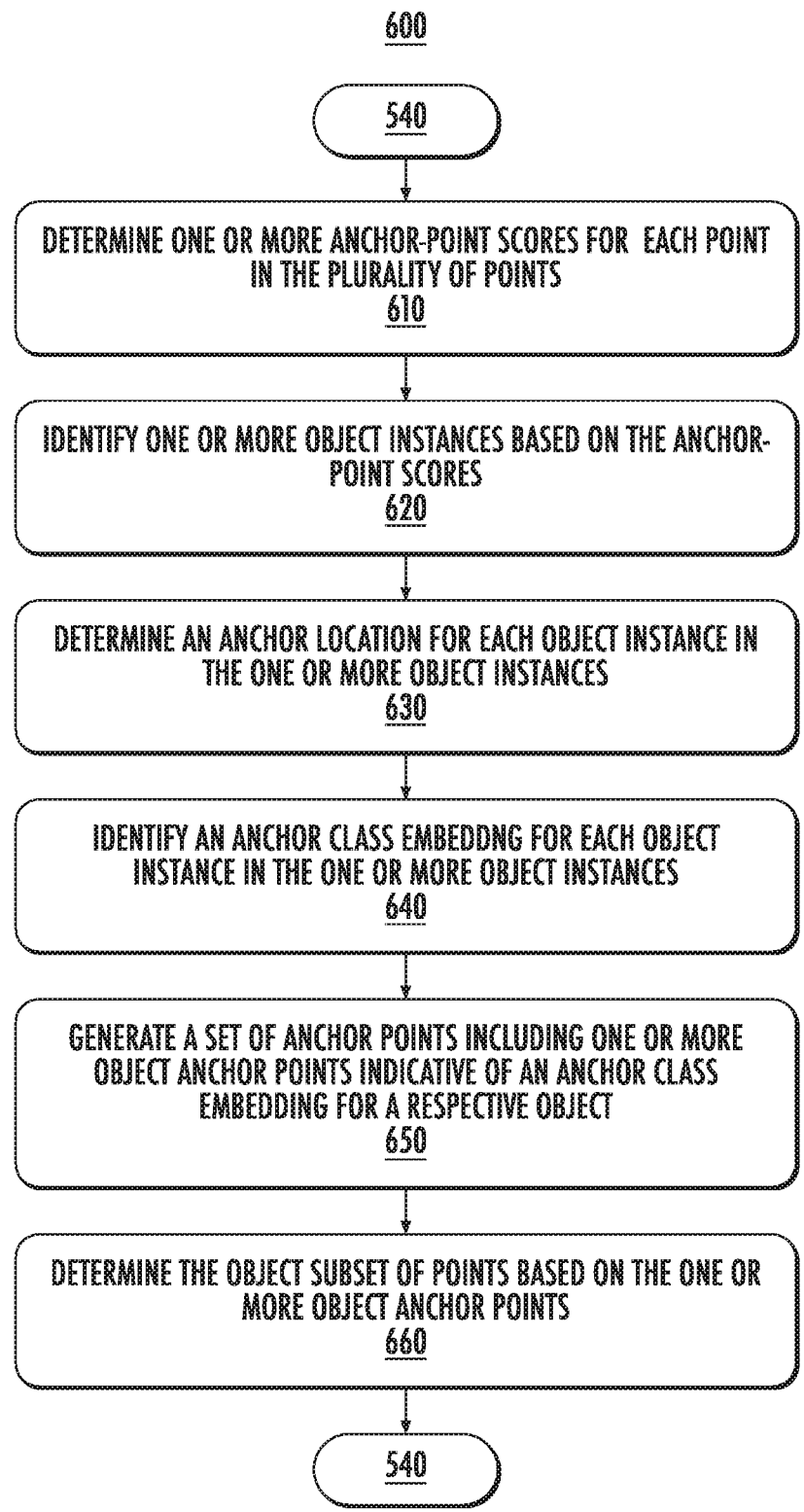
FIG. 6 depicts a flowchart diagram of an example method for determining a first subset of points associated with one or more known objects according to example implementations of the present disclosure.

FIG. 6 depicts a flowchart diagram of an example method for determining the first subset of points associated with one or more known objects according to example implementations of the present disclosure. One or more portion(s) of the method 600 can be implemented by a computing system that includes one or more computing devices such as, for example, the computing systems described with reference to the other figures (e.g., the vehicle computing system 112, the instance detection system 150, the operations computing system 104, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 7-8, etc.), for example, to control the motion of a vehicle based on unknown instances. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At (610), the method 600 can include determining one or more anchor-point scores 220 for each point in the plurality of points. For example, a computing system (e.g., vehicle computing system 112, perception system 124, instance detection system 150, etc.) can determine one or more anchor-point scores 220 for each point in the plurality of points. For instance, the computing system can determine, for each respective point of the plurality of points, one or more anchor-point scores 220 by inputting each respective point and the feature embedding 210 associated with the respective point into a machine-learned instance scoring model 215. By way of example, the one or more anchor-point scores 220 for each respective point of the plurality of points can be indicative of a likelihood that the respective point is associated with one or more known semantic classes in a closed set of semantic classes. In some implementations, the machine-learned feature embedding model 205, the machine-learned instance scoring model 215, and the machine-learned category-agnostic instance model 225 can be jointly trained end-to-end via backpropagation.

At (620), the method 600 can include identifying one or more object instances 255 based on the one or more anchor-point scores 220. For example, a computing system (e.g., vehicle computing system 112, perception system 124, instance detection system 150, etc.) can identify one or more object instances 255 based on the one or more anchor-point scores 220. For instance, the computing system can identify the one or more object instances 255 based, at least in part, on the one or more anchor-point scores 220 associated with each respective point of the plurality of points.

At (630), the method 600 can include determining an anchor location for each object instance in the one or more object instances 255. For example, a computing system (e.g., vehicle computing system 112, perception system 124, instance detection system 150, etc.) can determine an anchor location for each object instance in the one or more object instances 255. For instance, the computing system can determine an anchor location for each object instance in the one or more object instances 255 based, at least in part, on the one or more anchor-point scores 220 associated with each respective point of the plurality of points.

At (640), the method 600 can include identifying an anchor class embedding for each object instance in the one or more object instances 255. For example, a computing system (e.g., vehicle computing system 112, perception system 124, instance detection system 150, etc.) can identify an anchor class embedding for each object instance in the one or more object instances 255. For instance, the computing system can identify an anchor class embedding for each object instance in the one or more object instances 255 based, at least in part, on the anchor location associated with each object instance. For example, each anchor class embedding can be indicative of a respective class embedding associated with a respective point in the plurality of points.

At (650), the method 600 can include generating a set of anchor points including one or more object anchor points indicative of an anchor class embedding for a respective object. For example, a computing system (e.g., vehicle computing system 112, perception system 124, instance detection system 150, etc.) can generate a set of anchor points including one or more object anchor points indicative of an anchor class embedding. For instance, the computing system can generate a set of anchor points can include one or more object anchor point. For example, each object anchor point can be indicative of the anchor class embedding for a respective object instance in the one or more object instances 255. In addition, or alternatively, the set of anchor points can include one or more background anchor points. For example, each background anchor point can be indicative of a respective background embedding 240 associated with a respective point in the plurality of points.

At (660), the method 600 can include determining the object subset of points 260 based on the one or more object anchor points. For example, a computing system (e.g., vehicle computing system 112, perception system 124, instance detection system 150, etc.) can determine the object subset of points 260 based on the one or more object anchor points. For instance, the computing system can determine the object subset of points 260 based, at least in part, on the one or more object anchor points. In addition, or alternatively, the computing system can cluster each respective point of the object subset of points 260 with a respective object instance in the one or more object instances 255 based, at least in part, on the class embedding 235 associated with the respective point.

By way of example, the computing system can assign a known semantic class label indicative of the respective object instance to the respective point. For instance, the computing system can identify a respective object instance in the one or more object instances 255 that is most similar to a respective point based, at least in part, on the point-anchor association score associated with the respective point. In some implementations, the computing system can assign a known semantic class label indicative of the respective object instance to the respective point. In this manner, clustering each respective point of the object subset of points 260 with a respective object instance in the one or more object instances 255 can be based, at least in part, on the class embedding 235 associated with the respective point.

Figure 7:
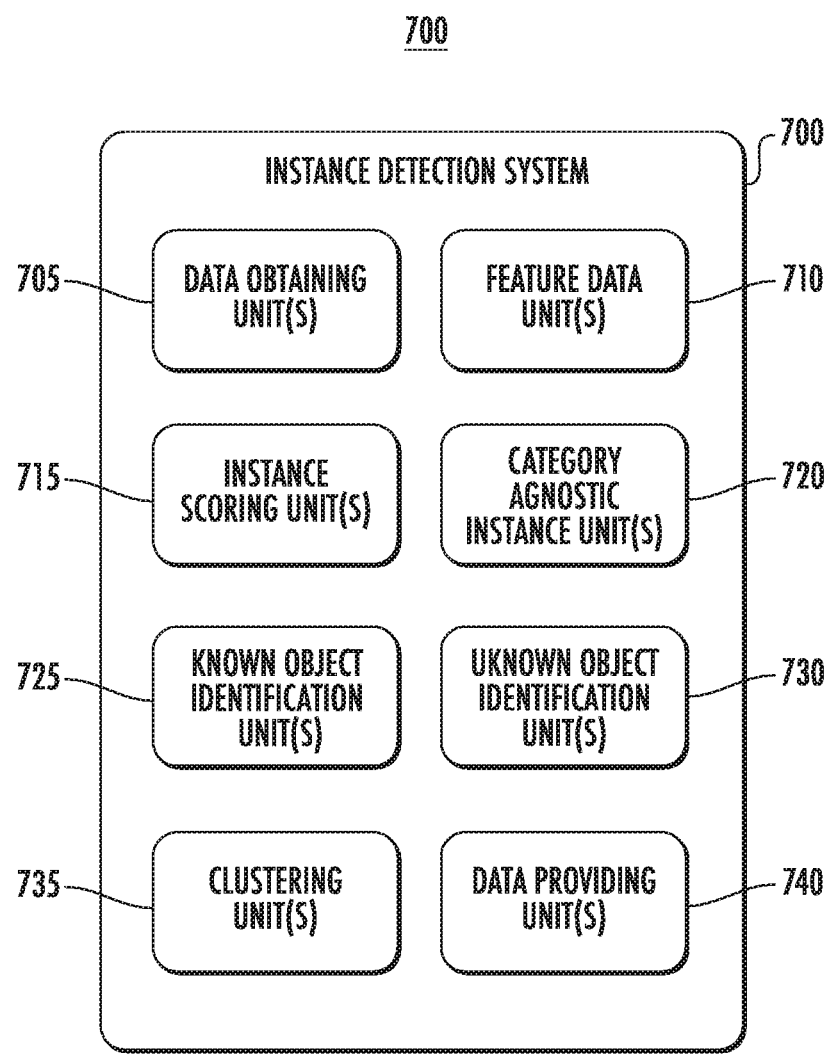
FIG. 7 depicts example system with various means for performing operations and functions according to example implementations of the present disclosure.

Various means can be configured to perform the methods and processes described herein. For example, FIG. 7 depicts an example system 700 that includes various means according to example embodiments of the present disclosure. The computing system 700 can be and/or otherwise include, for example, the instance detection system. The computing system 700 can include data obtaining unit(s) 705, feature data unit(s) 710, instance scoring unit(s) 715, category agnostic instance unit(s) 720, known object identification unit(s) 725, unknown object identification unit(s) 730, clustering unit(s) 735, data providing unit(s) 740, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 705) can be configured to obtain data (e.g., sensor point cloud input data 152, etc.). By way of example, the means (e.g., data obtaining unit(s) 705, etc.) can be configured to obtain sensor point cloud input data 152 from one or more sensors onboard a vehicle and/or another system. For example, the means (e.g., data obtaining unit(s) 705, etc.) can be configured to receive sensor point cloud input data 152 including a plurality of points. Each point in the plurality of points, for example, can include one or more three-dimensional coordinates.

The means (e.g., feature data unit(s) 710, etc.) can be configured to determine a feature embedding 210 for each respective point of the plurality of points. For example, the means (e.g., feature data unit(s) 710, etc.) can be configured to determine the feature embedding 210 by inputting each point into a machine-learned feature embedding model 205. By way of example, the machine-learned feature embedding model 205 can be configured to output a feature embedding 210 based on an input point. The means (e.g., instance scoring unit(s) 215, etc.) can be configured to determine, for each respective point of the plurality of points, one or more anchor-point scores 220. For example, the means (e.g., instance scoring unit(s) 215, etc.) can be configured to input each respective point and the feature embedding 210 associated with the respective point into a machine-learned instance scoring model 215. The machine-learned instance scoring model 215, for example, can be configured to output one or more anchor-point scores 220 associated with an input point.

The means (e.g., category-agnostic instance unit(s) 720) can be configured to determine, for each respective point of the plurality of points, at least one of an instance embedding 230, a class embedding 235, or a background embedding 240. For example, the means (e.g., category-agnostic instance unit(s) 720) can be configured to input each respective point and the feature embedding 210 associated with the respective point into a machine-learned category-agnostic instance model 725. The machine-learned category-agnostic model 725, for example, can be configured to output at least one instance embedding 230, class embedding 235, or background embedding 240 for the input point and feature representation 210.

The means (e.g., known object identification unit(s) 725) can be configured to determine a first subset of points associated with one or more known instances within an environment. The means (e.g., known object identification unit(s) 725) can determine the first subset of points based, at least in part, on the class embedding 235 and the background embedding 240 associated with each respective point of the plurality of points. The one or more known instances, for example, can be associated with a respective class-specific semantic label of one or more class-specific semantic labels. For example, the means (e.g., known object identification unit(s) 725) can be configured to identify the one or more object instances 255 based, at least in part, on the one or more anchor-point scores associated with each respective point of the plurality of points. The means (e.g., known object identification unit(s) 725) can determine an anchor location for each object instance in the one or more object instances 255 based, at least in part, on the one or more anchor-point scores 220 associated with each respective point of the plurality of points. The means (e.g., known object identification unit(s) 725) can identify an anchor class embedding for each object instance in the one or more object instances 255 based, at least in part, on the anchor location associated with each object instance. For example, each anchor class embedding can be indicative of a respective class embedding associated with a respective point in the plurality of points. The means (e.g., known object identification unit(s) 725) can generate a set of anchor points can include one or more object anchor points. Each object anchor point can be indicative of the anchor class embedding for a respective object instance in the one or more object instances 255. In some implementations, the means (e.g., known object identification unit(s) 725) can determine the first subset of points based, at least in part, on the one or more object anchor points.

The means (e.g., unknown object identification unit(s) 730) can be configured to determine a second subset of points 280 associated with one or more unknown instances 275 within the environment. The means (e.g., unknown object identification unit(s) 730) can determine the second subset of points 280 based, at least in part, on the first subset of points. For example, the one or more unknown instances 275 can be unassociated with the one or more class-specific semantic labels. The means (e.g., clustering unit(s) 735) can be configured to cluster each respective point of the second subset of points 280 into a respective unknown instance in the one or more unknown instances 275. For example, the means (e.g., clustering unit(s) 735) can cluster each respective point of the second subset of points 280 based, at least in part, on the instance embedding 230 and the three-dimensional coordinates associated with the respective point. In addition, or alternatively, the means (e.g., clustering unit(s) 735) can be configured to cluster each respective point of the first subset of points with an object instance and/or a background instance based, at least in part, on the class embedding 235 and/or the background embedding 240 associated with the respective point.

The means (e.g., the data providing unit(s) 740) can be configured to provide data indicative of one or more known objects and/or one or more unknown objects in an environment. For example, the means (e.g., the data providing unit(s) 740) can provide data indicative of one or more known and/or unknown object to one or more systems onboard a vehicle. In this manner, the an autonomous vehicle can control the motion of the autonomous vehicle based, at least in part, on the one or more known objects and the one or more unknown objects.

These described functions of the means are provided as examples and are not meant to be limiting. The means can be configured for performing any of the operations and functions described herein.

Figure 8:
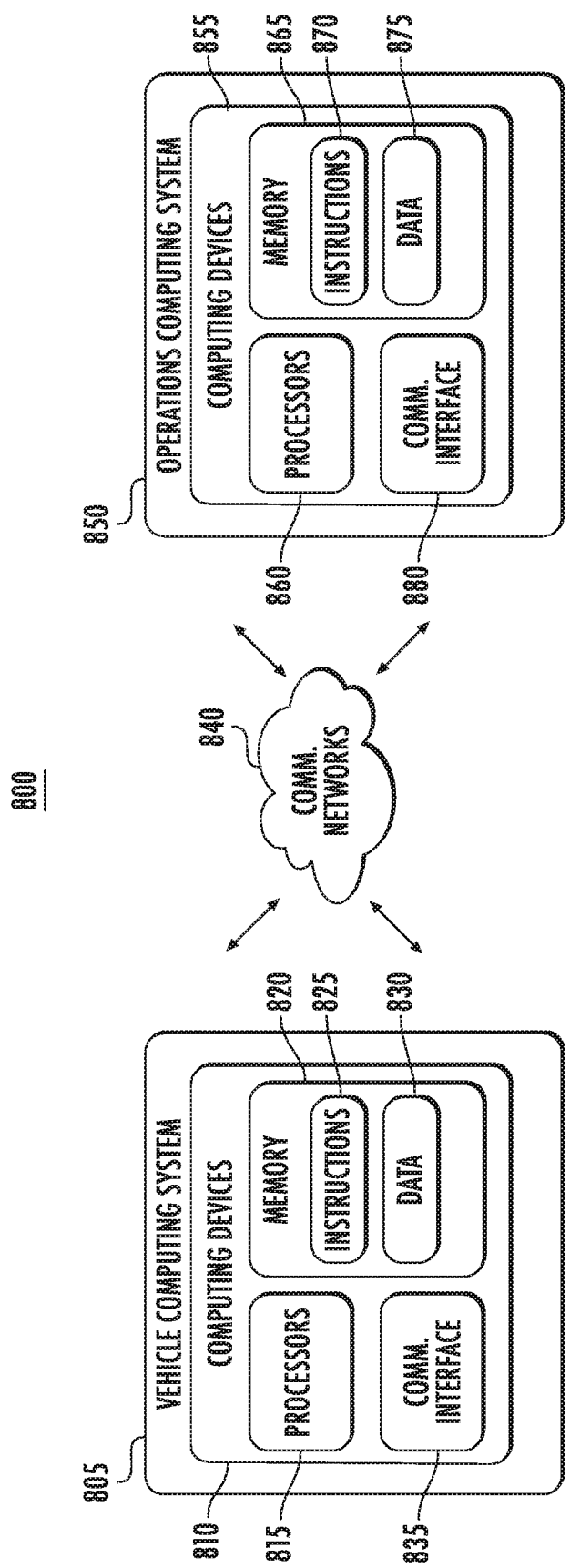
FIG. 8 depicts example system components according to example implementations of the present disclosure.

FIG. 8 depicts example system components of an example system 800 according to example implementations of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 (e.g., vehicle computing system 112, instance detection system 150, perception system 124, etc.) and a remote computing system 850 (e.g., operations computing system 104, remote computing devices 106, etc.) that are communicatively coupled over one or more network(s) 845. As described herein, the vehicle computing system 805 can be implemented onboard a vehicle (e.g., as a portion of the vehicle computing system 112) and/or can be remote from a vehicle (e.g., as a portion of an operations computing system 104). In either case, a vehicle computing system 800 can utilize the operations and model(s) of the instance detection system 150 (e.g., locally, via wireless network communication, etc.).

The vehicle computing system 805 can include one or computing device(s) 810. The computing device(s) 810 of the vehicle computing system 805 can include processor(s) 815 and a memory 820. The one or more processor(s) 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, etc., and/or combinations thereof.

The memory 820 can store information that can be obtained by the one or more processor(s) 815. For instance, the memory 820 (e.g., one or more non-transitory computer-readable storage mediums, memory devices, etc.) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (e.g., of the vehicle computing system 112) such as any of the operations and functions of the vehicle computing system 112, the instance detection system 150, etc. and/or for which the vehicle computing system 112, the instance detection system 150 is configured, as described herein. For example, the vehicle computing system 1005 can be configured to perform the operations of the vehicle computing system 112, the decision system 150, and/or any of the methods or means described herein.

The memory 820 can store data 830 that can be obtained (e.g., received, accessed, written, manipulated, generated, created, stored, etc.). The data 830 can include, for instance, sensor data 116 (e.g., image data, LiDAR data), sensor point cloud input data 152, and/or other data/information described herein. In some implementations, the computing device(s) 810 can obtain data from one or more memories that are remote from the vehicle computing system 805. In some implementations, the vehicle computing system 805 can obtain data that is remote from the vehicle computing system 805.

The computing device(s) 810 can also include a communication interface 835 used to communicate with one or more other system(s) (e.g., other systems onboard and/or remote from a vehicle, the other systems of FIG. 8, etc.). The communication interface 835 can include any circuits, components, software, etc. for communicating via one or more networks (e.g., 845). In some implementations, the communication interface 835 can include, for example, one or more of a communications controller, receiver, transceiver, transmitter, port, conductors, software and/or hardware for communicating data/information.

The remote computing system 850 can include one or more computing device(s) 855. The computing device(s) 855 can include one or more processors 860 and at least one memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registers, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the vehicle computing system 112, the remote computing system 104 and/or computing device(s) 855, or for which any of these computing systems are configured, as described herein. For example, the processors 860 can be configured to perform any of the operations and function of the instance detection system 150, one or more portions of the method 500, 600 or both as described herein, and/or any other operations and functions described herein.

The memory 865 can store data 875 that can be obtained and/or stored. The data 875 can include, for instance, sensor data (e.g., image data, LiDAR data, etc.), data associated with one or more objects (e.g., sensor point cloud input data 152), and/or other data/information as described herein. In some implementations, the computing device(s) 855 can obtain data from one or more memories that are remote from the remote computing system 850.

The computing device(s) 855 can also include a communication interface 880 used to communicate with one or more other system(s) (e.g., the vehicle computing system 805, etc.). The communication interface 880 can include any circuits, components, software, etc. for communicating via one or more networks (e.g., network(s) 845). In some implementations, the communication interface 880 can include, for example, one or more of a communications controller, receiver, transceiver, transmitter, port, conductors, software, and/or hardware for communicating data.

The network(s) 845 can be any type of network or combination of networks that allows for communication between devices. In some embodiments, the network(s) 845 can include one or more of a local area network, wide area network, the Internet, secure network, cellular network, mesh network, peer-to-peer communication link and/or some combination thereof and can include any number of wired or wireless links. Communication over the network(s) 845 can be accomplished, for instance, via a network interface using any type of protocol, protection scheme, encoding, format, packaging, etc.

Computing tasks discussed herein as being performed at computing device(s) remote from an autonomous vehicle can instead be performed at the vehicle (e.g., via the vehicle computing system 805), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for classifying unknown objects, the method comprising:
    receiving, by a computing system comprising one or more computing devices, sensor point cloud input data comprising a plurality of points, wherein each point comprises one or more three-dimensional coordinates;
    determining, by the computing system, a feature embedding for each respective point of the plurality of points by inputting each point into a machine-learned feature embedding model;
    for each respective point of the plurality of points, determining, by the computing system, at least one of an instance embedding, a class embedding, or a background embedding by inputting each respective point and the feature embedding associated with the respective point into a machine-learned category-agnostic instance model;
    determining, by the computing system, a first subset of points associated with one or more known instances within an environment based, at least in part, on the class embedding or the background embedding associated with one or more respective points of the plurality of points, wherein each one of the one or more known instances is associated with a respective class-specific semantic label of one or more class-specific semantic labels;
    determining, by the computing system, a second subset of points associated with one or more unknown instances within the environment based, at least in part, on the first subset of points, wherein the one or more unknown instances are not associated with the one or more class-specific semantic labels; and
    clustering, by the computing system, each respective point in the second subset of points into a respective unknown instance of the one or more unknown instances based, at least in part, on the instance embedding and the three-dimensional coordinates associated with the respective point.

2. The computer implemented method of claim 1, wherein determining the first subset of points comprises:
    determining, by the computing system, an object subset of points associated with one or more object instances within the environment based, at least in part, on the class embedding associated with each respective point of the plurality of points, wherein the one or more object instances are associated with an object-specific semantic label; and
    determining, by the computing system, a background subset of points associated with one or more background instances within the environment based, at least in part, on the background embedding associated with each respective point of the plurality of points, wherein the one or more background instances are associated with a background-specific semantic label.

3. The computer-implemented method of claim 2, wherein determining the object subset of points based, at least in part, on the class embedding associated with each respective point of the plurality of points comprises: for each respective point of the plurality of points, determining, by the computing system, one or more anchor-point scores by inputting each respective point and the feature embedding associated with the respective point into a machine-learned instance scoring model; identifying, by the computing system, the one or more object instances based, at least in part, on the one or more anchor- point scores associated with each respective point of the plurality of points; determining, by the computing system, an anchor location for each object instance in the one or more object instances based, at least in part, on the one or more anchor-point scores associated with each respective point of the plurality of points; identifying, by the computing system, an anchor class embedding for each object instance in the one or more object instances based, at least in part, on the anchor location associated with each object instance, wherein each anchor class embedding is indicative of a respective class embedding associated with a respective point of the plurality of points; generating, by the computing system, a set of anchor points comprising one or more object anchor points, each object anchor point indicative of the anchor class embedding for a respective object instance in the one or more object instances; and determining, by the computing system, the object subset of points based, at least in part, on the one or more object anchor points.

4. The computer-implemented method of claim 3, further comprising: clustering, by the computing system, each respective point of the object subset of points with a respective object instance in the one or more object instances based, at least in part, on the class embedding associated with the respective point.

5. The computer-implemented method of claim 4, wherein clustering each respective point of the object subset of points with the respective object instance further comprises: assigning, by the computing system, a known semantic class label indicative of the respective object instance to the respective point.

6. The computer-implemented method of claim 3, wherein the one or more anchor-point scores for each respective point of the plurality of points are indicative of a likelihood that the respective point is associated with one or more known semantic classes in a closed set of semantic classes.

7. The computer-implemented method of claim 3, wherein the set of anchor points comprises one or more background anchor points, each background anchor point indicative of a respective background embedding associated with a respective point of the plurality of points.

8. The computer-implemented method of claim 7, wherein determining the first subset of points further comprises: determining, by the computing system, a point-anchor association score for each respective point of the plurality of points based, at least in part, on a comparison between the class embedding or the background embedding associated with the respective point and the set of anchor points, wherein the point-anchor association score is indicative of a similarity between the respective point and at least one anchor point in the set of anchor points; and determining, by the computing system, the first subset of points based, at least in part, on the point-anchor association score associated with each respective point of the plurality of points, wherein each respective point in the first subset of points is associated with a point-anchor association score within a similarity threshold.

9. The computer-implemented method of claim 1, wherein clustering each respective point of the second subset of points with the respective unknown instance further comprises:
assigning, by the computing system, an unknown semantic class label indicative of the respective unknown instance to the respective point.

10. A computing system comprising:
one or more processors; and
one or more tangible, non-transitory, computer readable media that collectively store instructions that when executed by the one or more processors cause the computing system to perform operations comprising:
receiving sensor point cloud input data comprising a plurality of points, wherein each point comprises one or more three-dimensional coordinates;
determining a feature embedding for each respective point of the plurality of points by inputting each respective point into a machine-learned feature embedding model;
for each respective point of the plurality of points, determining at least one of an instance embedding, a class embedding, or a background embedding by inputting each respective point and the feature embedding associated with the respective point into a machine-learned category-agnostic instance model;
determining for each respective point of the plurality of points one or more anchor-point scores by inputting each respective point and the feature embedding associated with the respective point into a machine-learned instance scoring model;
identifying one or more object instances within an environment based, at least in part, on the one or more anchor-point scores associated with each respective point;
determining an anchor location for each object instance in the one or more object instances based, at least in part, on the one or more anchor-point scores associated with each respective point of the plurality of points;
identifying an anchor class embedding for each object instance of the one or more object instances based, at least in part, on the anchor location associated with each object instance, wherein each anchor class embedding is indicative of a class embedding associated with a respective point of the plurality of points;
generating a set of anchor points comprising one or more object anchor points, each object anchor point indicative of an anchor class embedding associated with a respective object instance of the one or more object instances;
determining an object subset of points comprising one or more points of the plurality of points based, at least in part, on the one or more object anchor points; and
clustering each respective point of the object subset of points with a respective object instance of the one or more object instances based, at least in part, on the class embedding associated with the respective point.

11. The computing system of claim 10, further comprising:
determining a first subset of points associated with one or more known instances within the environment based, at least in part, on the object subset of points and the background embedding associated with one or more respective points of the plurality of points, wherein each one of the one or more known instances is associated with a respective class-specific semantic label of one or more class-specific semantic labels; and
determining a second subset of points associated with one or more unknown instances within the environment based, at least in part, on the first subset of points, wherein the one or more unknown instances are not associated with the one or more class-specific semantic labels.

12. The computing system of claim 11, further comprising: clustering each respective point of the second subset of points with a respective unknown instance of the one or more unknown instances based, at least in part, on the instance embedding and the three-dimensional coordinates associated with the respective point.

13. The computing system of any of claim 10, wherein determining the object subset of points based, at least in part, on the one or more object anchor points, comprises: determining a point-anchor association score for each respective point of the plurality of points based, at least in part, on a comparison between the class embedding associated with the respective point and the one or more object anchor points, wherein the point-anchor association score is indicative of a similarity between the respective point and at least one object anchor point; and determining the object subset of points based, at least in part, on the point-anchor association score associated with each respective point of the plurality of points, wherein each respective point of the object subset of points is associated with a point-anchor association score within a similarity threshold.

14. The computing system of claim 13, wherein clustering each respective point of the object subset of points into a respective object instance of the one or more object instances further comprises: identifying a respective object instance of the one or more object instances that is most similar to the respective point based, at least in part, on the point-anchor association score associated with the respective point; and assigning a known semantic class label indicative of the respective object instance to the respective point.

15. The computing system of claim 14, wherein clustering each respective point of the object subset of points with a respective object instance of the one or more object instances is based, at least in part, on the class embedding associated with the respective point.

16. The computing system of claim 10, wherein the machine-learned feature embedding model, the machine-learned instance scoring model, and the machine-learned category-agnostic instance model have been jointly trained end-to-end via backpropagation.

17. An autonomous vehicle comprising:
one or more vehicle sensors;
one or more processors;
a machine-learned feature embedding model;
a machine-learned category-agnostic instance model; and
one or more tangible, non-transitory, computer readable media that collectively store instructions that when executed by the one or more processors cause the one or more processors to perform operations comprising:
receiving sensor point cloud input data associated with the surrounding environment of the autonomous vehicle, the sensor point cloud input data comprising a plurality of points, wherein each point comprises one or more three-dimensional coordinates;
determining a feature embedding for each respective point of the plurality of points by inputting each point into the machine-learned feature embedding model;
for each respective point of the plurality of points, determining at least one of an instance embedding, a class embedding, or a background embedding by inputting each respective point and the feature embedding associated with the respective point into the machine-learned category-agnostic instance model;
determining a first subset of points associated with one or more known instances within the surrounding environment based, at least in part, on the class embedding and the background embedding associated with one or more respective points of the plurality of points;
determining a second subset of points associated with one or more unknown instances within the surrounding environment based, at least in part, on the first subset of points; and
clustering each respective point of the second subset of points into a respective unknown instance of the one or more unknown instances based, at least in part, on the instance embedding and the three-dimensional coordinates associated with the respective point.

18. The autonomous vehicle of claim 17, further comprising:
clustering each respective point of the first subset of points into a respective known instance of the one or more known instances based, at least in part, on the class embedding and the background embedding associated with the respective point.

19. The autonomous vehicle of claim 17, further comprising: assigning a known semantic class label indicative of a respective known instance of the one or more known instances to each respective point in the first subset of points; and assigning an unknown semantic class label indicative of a respective unknown instance of the one or more unknown instances to the respective point in the second subset of points.

20. The autonomous vehicle of claim 19, further comprising: identifying one or more known objects and one or more unknown objects within the surrounding environment of the autonomous vehicle based, at least in part, on the known semantic class labels and the unknown sematic class labels; and controlling the motion of the autonomous vehicle based, at least in part, on the one or more known objects and the one or more unknown objects.

* * * * *